United States Patent [19]

Matsumura et al.

[11] Patent Number: 4,989,025

[45] Date of Patent: Jan. 29, 1991

[54] CAMERA

[75] Inventors: Koichi Matsumura; Akira Yoshihara, both of Kanagawa, Japan

[73] Assignee: Canon Kabushiki Kaisha, Tokyo, Japan

[21] Appl. No.: 462,866

[22] Filed: Jan. 5, 1990

Related U.S. Application Data

[63] Continuation of Ser. No. 186,101, Apr. 25, 1988, abandoned.

[30] Foreign Application Priority Data

| Apr. 27, 1987 | [JP] | Japan | 62-102013 |
| Apr. 27, 1987 | [JP] | Japan | 62-102014 |
| Apr. 27, 1987 | [JP] | Japan | 62-102015 |
| Apr. 27, 1987 | [JP] | Japan | 62-102016 |
| Apr. 27, 1987 | [JP] | Japan | 62-102017 |
| Apr. 27, 1987 | [JP] | Japan | 62-102018 |
| Jul. 3, 1987 | [JP] | Japan | 62-167536 |
| Jul. 3, 1987 | [JP] | Japan | 62-167537 |
| Jul. 3, 1987 | [JP] | Japan | 62-167538 |
| Nov. 27, 1987 | [JP] | Japan | 62-299018 |
| Oct. 2, 1988 | [JP] | Japan | 63-027685 |
| Oct. 2, 1988 | [JP] | Japan | 63-027686 |

[51] Int. Cl.$^5$ .............................................. G03B 17/24
[52] U.S. Cl. .................................... 354/106; 354/289.12
[58] Field of Search ................... 354/105, 106, 289.1, 354/289.11, 128.12

[56] References Cited

U.S. PATENT DOCUMENTS

| 4,167,315 | 9/1979 | Nanba et al. | 354/106 |
| 4,198,146 | 4/1980 | Taguchi et al. | 354/106 |
| 4,217,046 | 8/1980 | Weinstein et al. | 354/106 X |
| 4,232,956 | 11/1980 | Hashimoto et al. | 354/106 |
| 4,330,186 | 5/1982 | Hattori | 354/106 |
| 4,344,682 | 8/1982 | Hattori | 354/106 X |
| 4,361,388 | 11/1982 | Mlcak et al. | 354/106 |
| 4,365,881 | 12/1982 | Hazama et al. | 354/106 X |
| 4,423,938 | 1/1984 | Tominaga | 354/106 |
| 4,490,029 | 12/1984 | Tanaka et al. | 354/106 |
| 4,678,301 | 7/1987 | Denner | 354/106 |
| 4,705,372 | 11/1987 | Lapeyre | 354/106 |

*Primary Examiner*—Michael L. Gellner
*Attorney, Agent, or Firm*—Fitzpatrick, Cella, Harper & Scinto

[57] ABSTRACT

A camera comprises a data imprinting means that can imprint any data such as a date (year, month and day) on a sensitive means, and a means for displaying any data to be imprinted, characterized by the fact that it is designed to calculate, display and imprint automatically the lapse of time from any specified date to the current date.

129 Claims, 30 Drawing Sheets

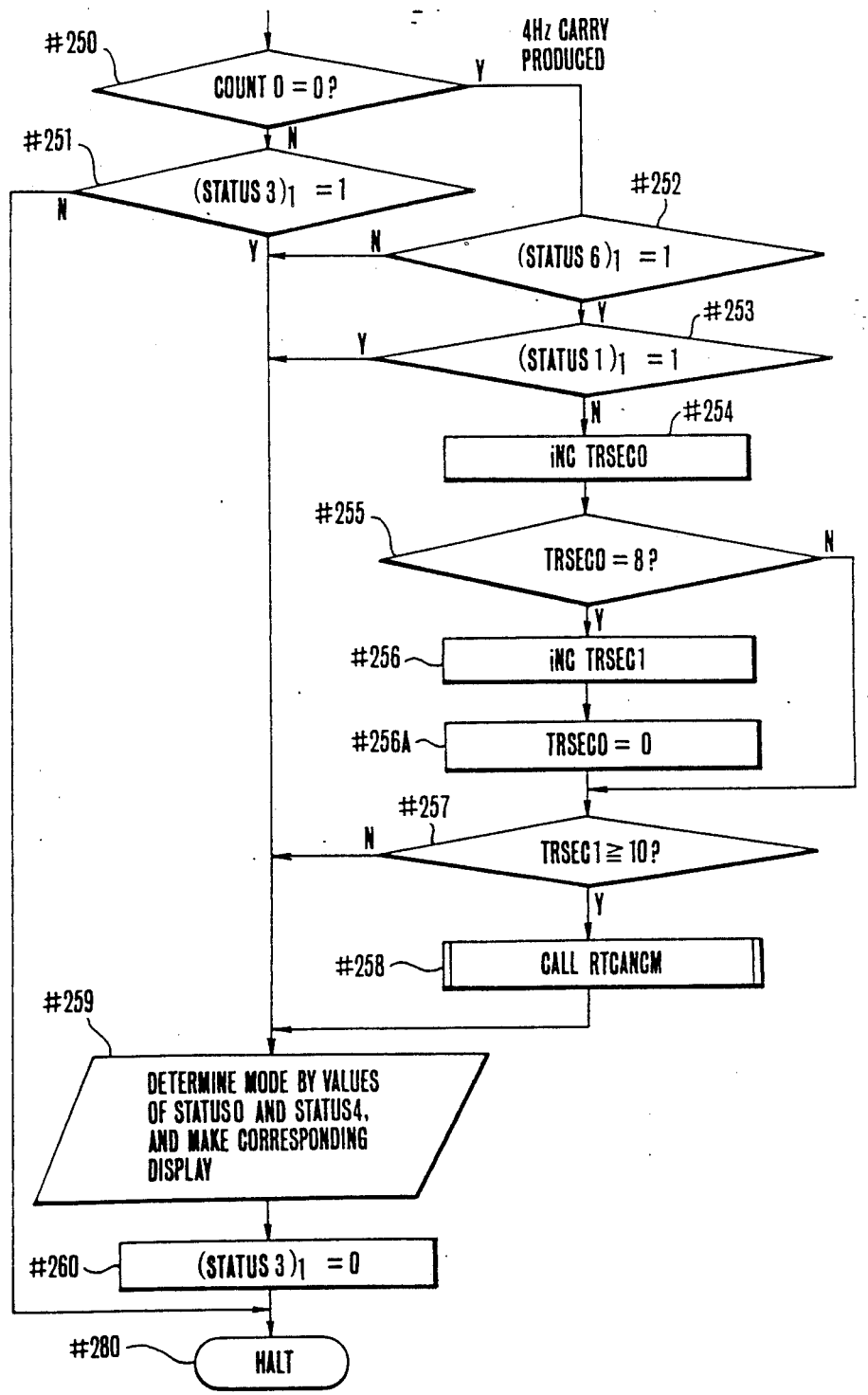

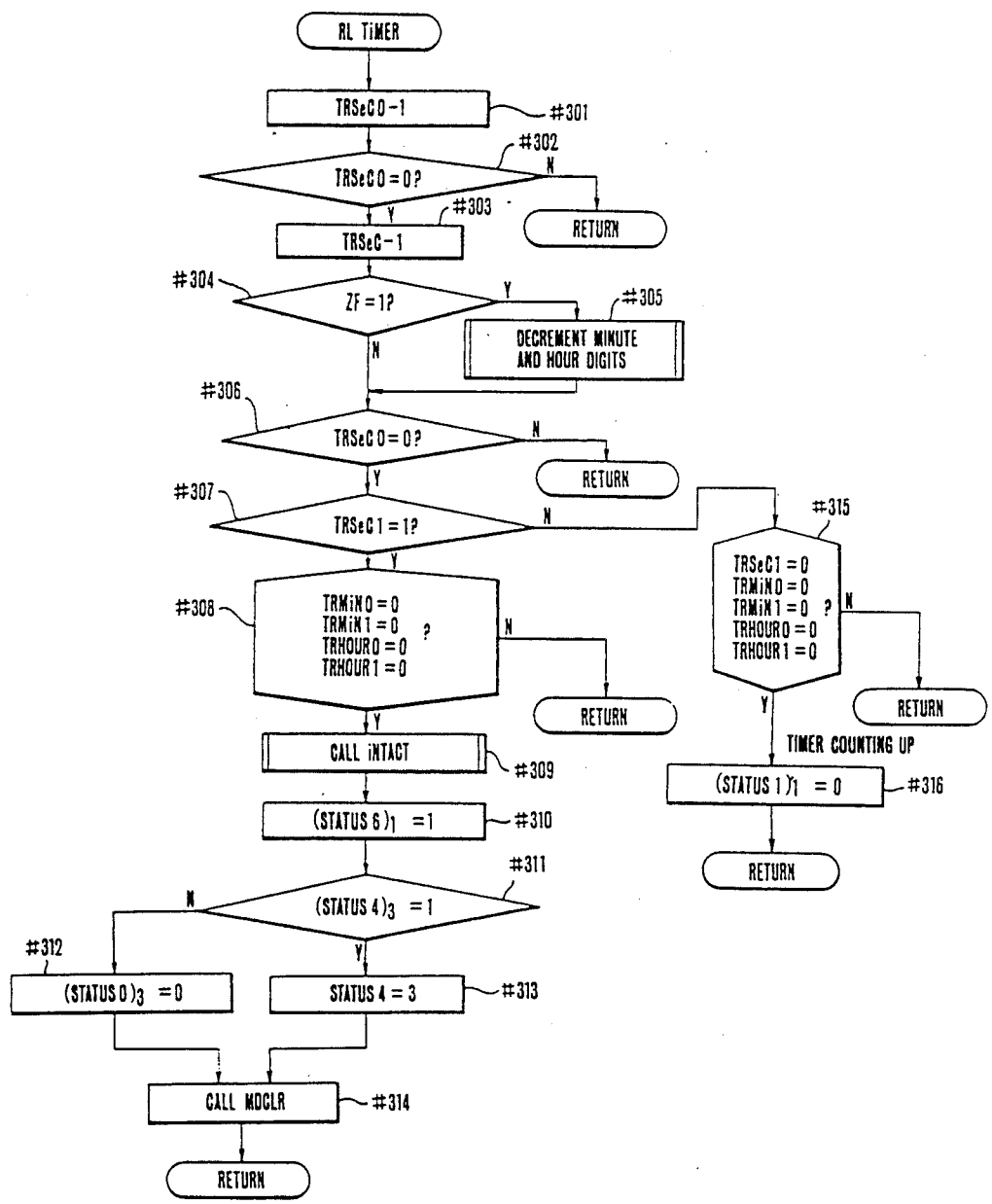

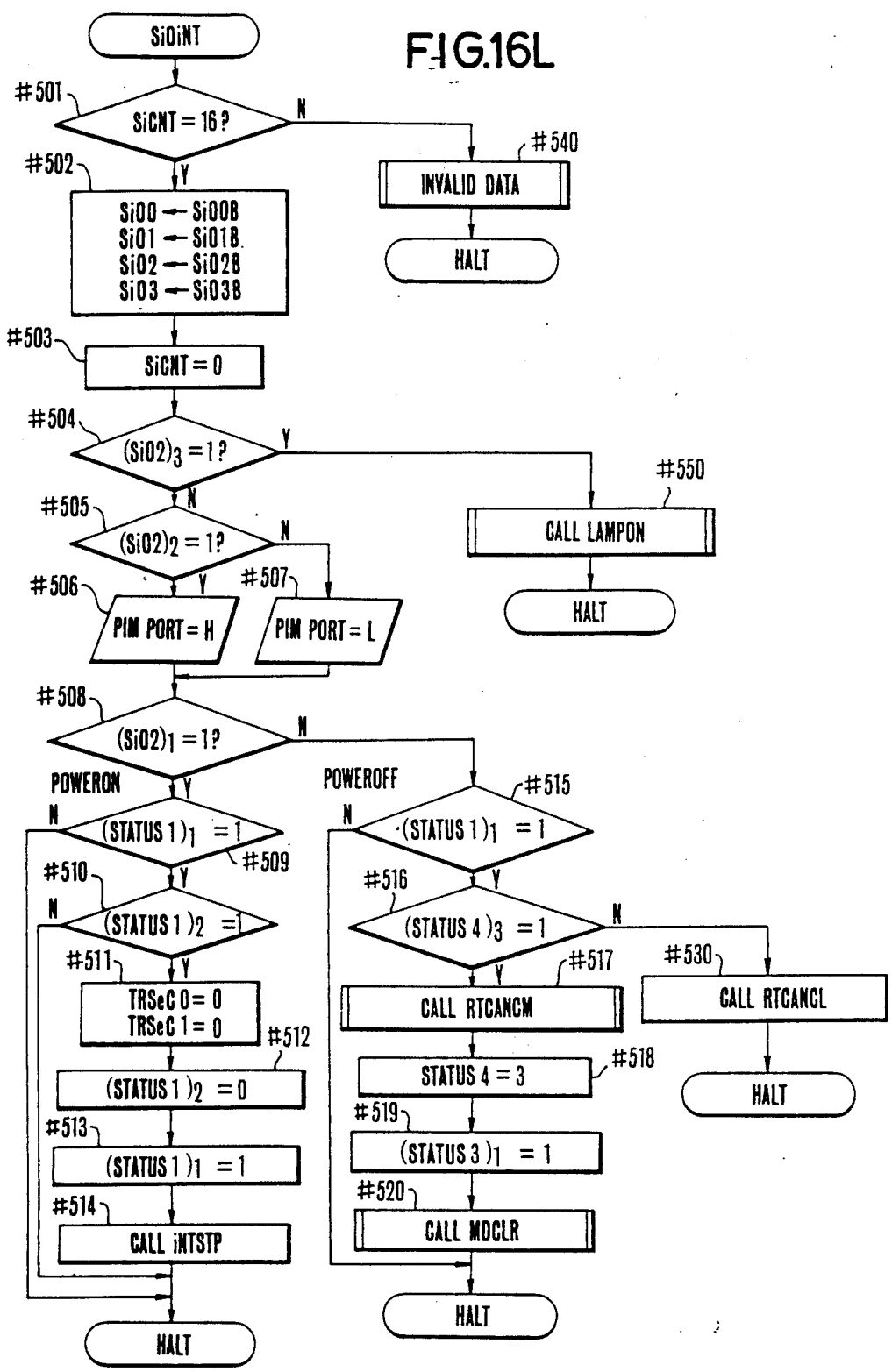

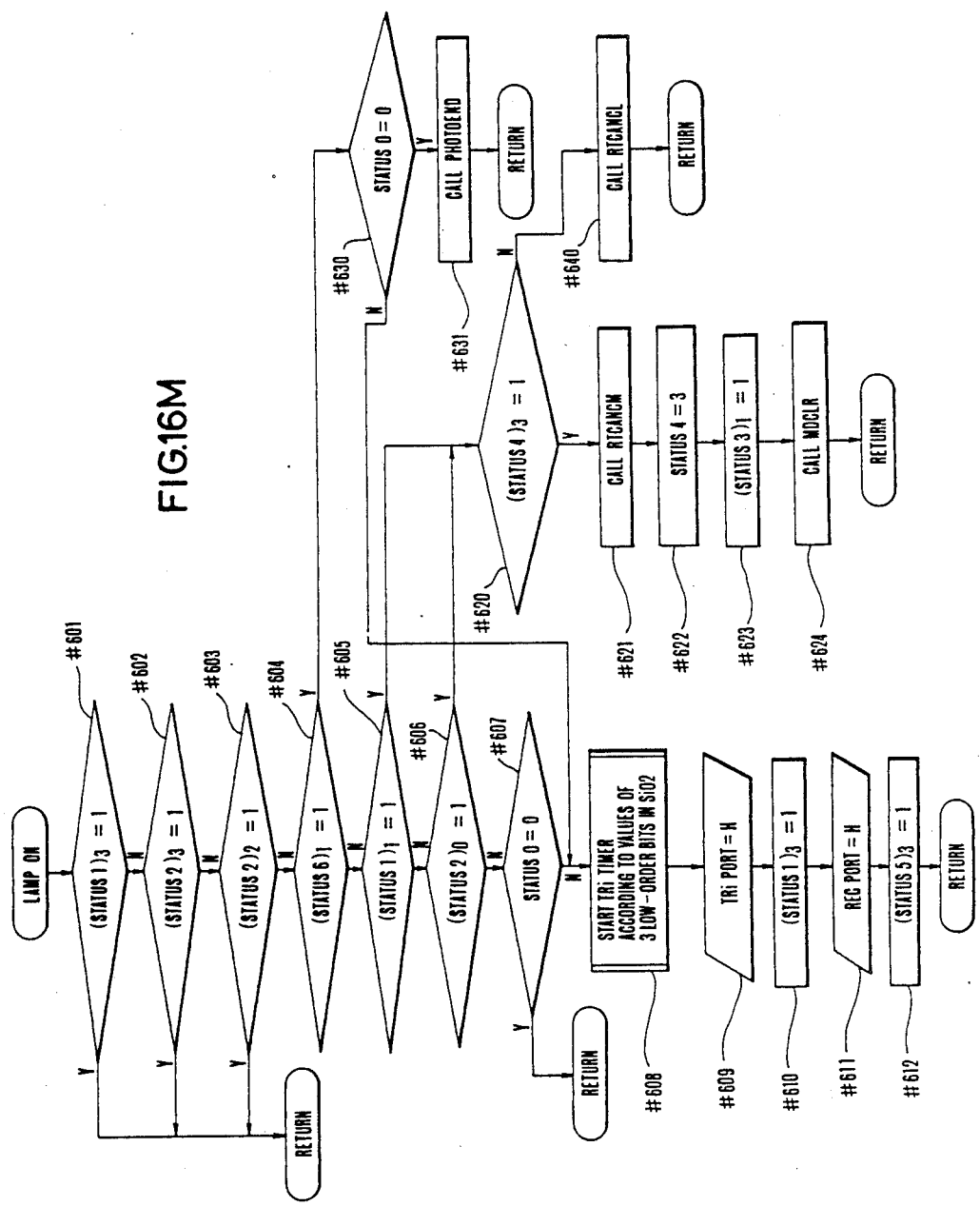

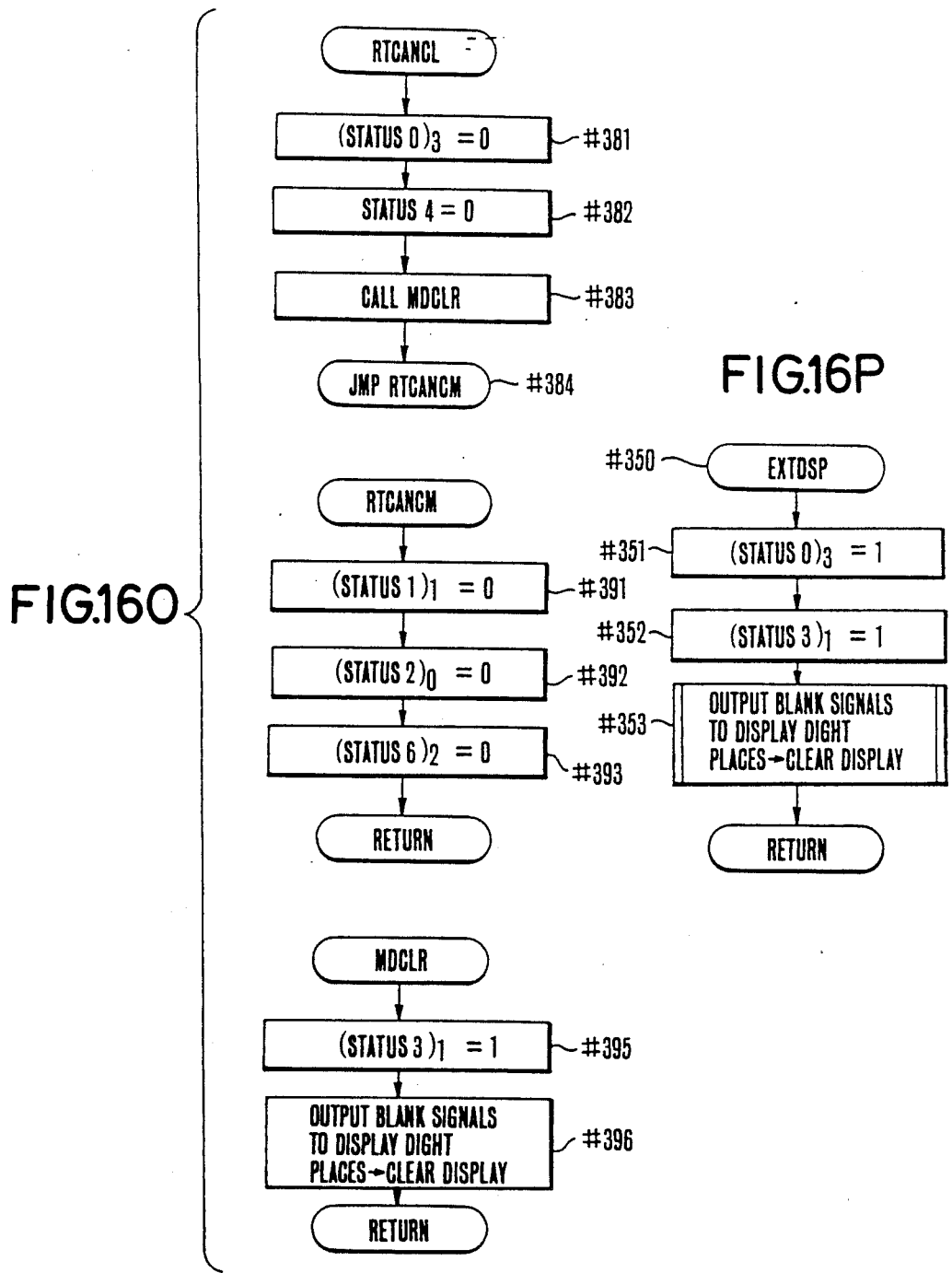

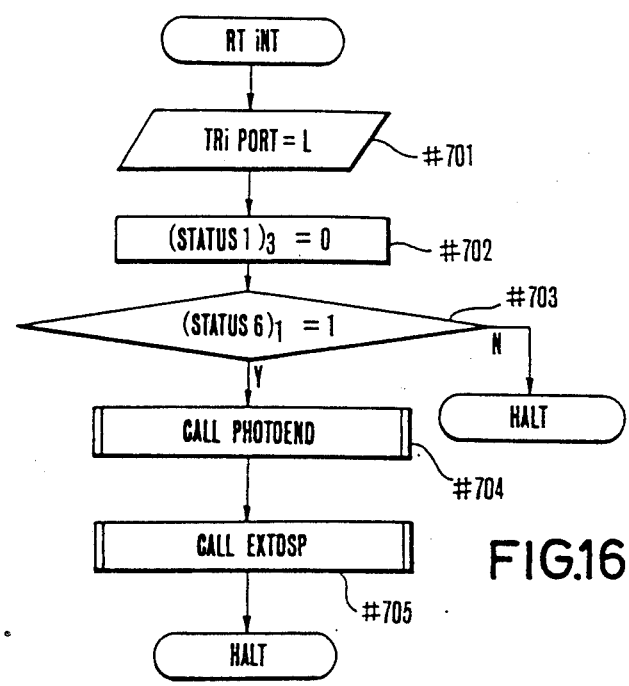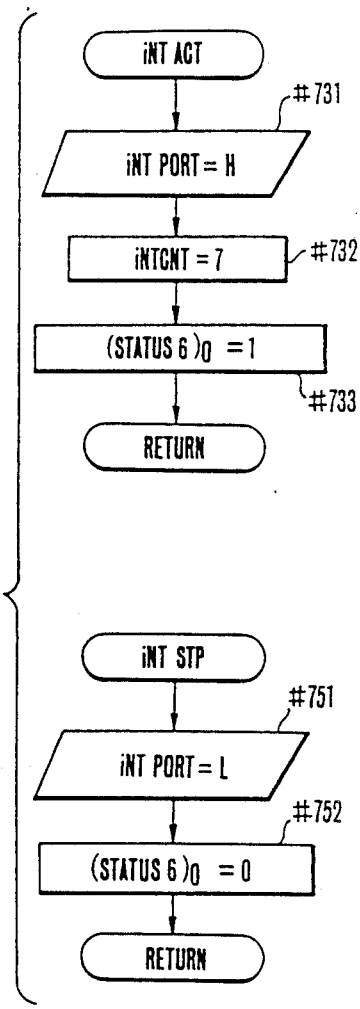

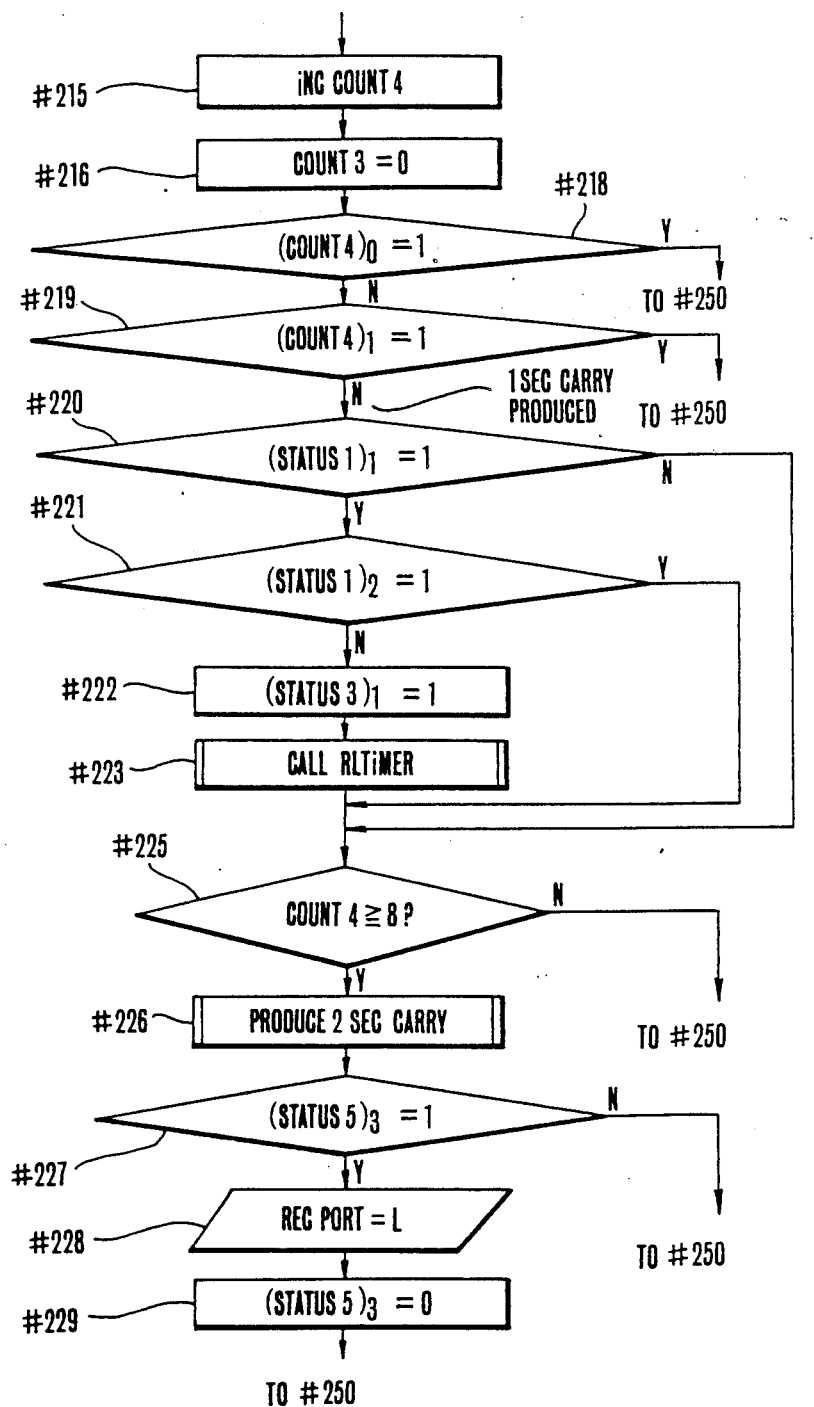

FIG.20

| MEMORY ADDRESS LABEL | CONTENTS | PORT ADDRESS | INPUT/OUTPUT |
|---|---|---|---|
| Y | CURRENT DATE YEAR DIGITS | Y0 ~ Y5 | I |
| M | CURRENT DATE MONTH DIGITS | M0 ~ M3 | I |
| D | CURRENT DATE DAY DIGITS | D0 ~ D4 | I |
| SY | REFERENCE DATE YEAR DIGITS | SY0 ~ SY5 | I |
| SM | REFERENCE DATE MONTH DIGITS | SM0 ~ SM3 | I |
| SD | REFERENCE DATE DAY DIGITS | SD0 ~ SD4 | I |
| PY | DIGITS OF PASSED YEARS | PY0 ~ PY5 | — |
| PM | DIGITS OF PASSED MONTHS | PM0 ~ PM3 | — |
| PD | DIGITS OF PASSED DAYS | PD0 ~ PD4 | — |
| PH | HIGH-ORDER DIGITS OF TIME LAPSE DATA | PH0 ~ PH5 | O |
| PL | LOW-ORDER DIGITS OF TIME LAPSE DATA | PL0 ~ PL4 | O |
| DM | THE NUMBER OF DAYS IN THE REFERENCE MONTH | DM0 ~ PM4 | I |
| YM/MD CTRL | YEAR-MONTH/MONTH-DAY DISPLAY SWITCHING | YM/MD. CTRL | O |
| WARN | WARNING DISPLAY CONTROL | WARN | O |

FIG.21

| DM OUTPUT | MONTHS CONCERNED |
|---|---|
| 31 | 1, 3, 5, 7, 8, 10, 12. |
| 30 | 4, 6, 9, 11 |
| 29 | 2 (IN LEAP-YEAR) |
| 28 | 2 (IN NON-LEAP-YEAR) |

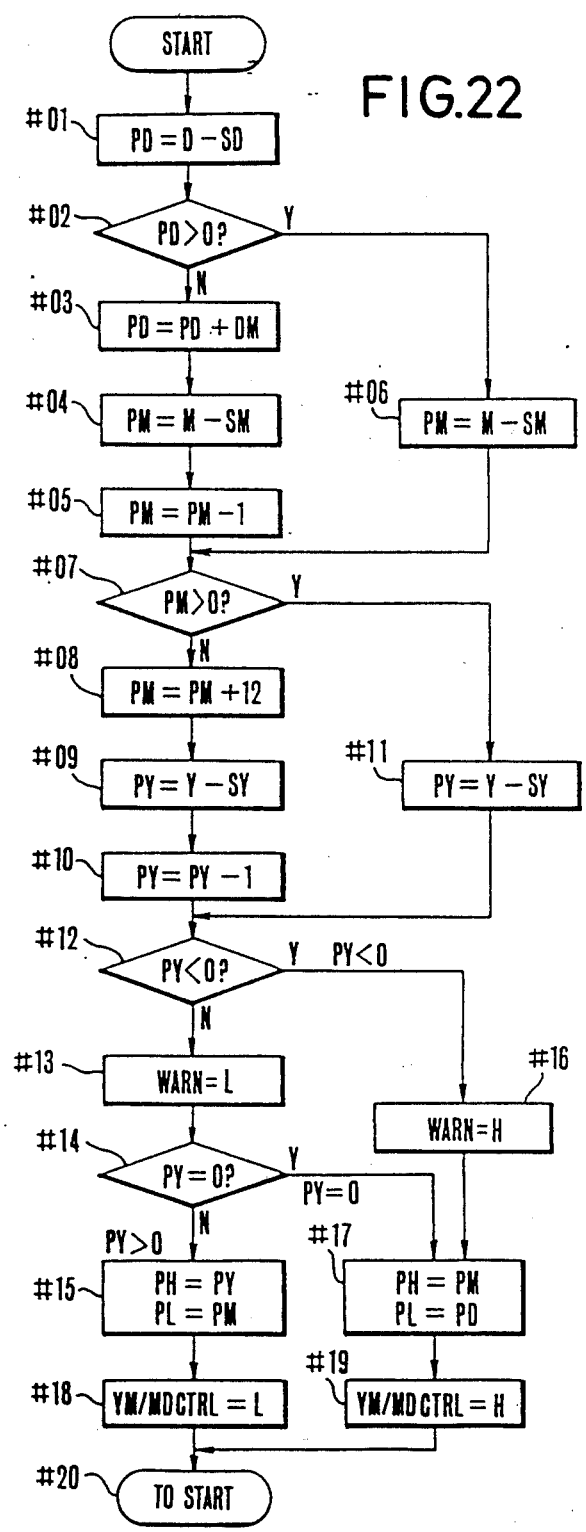

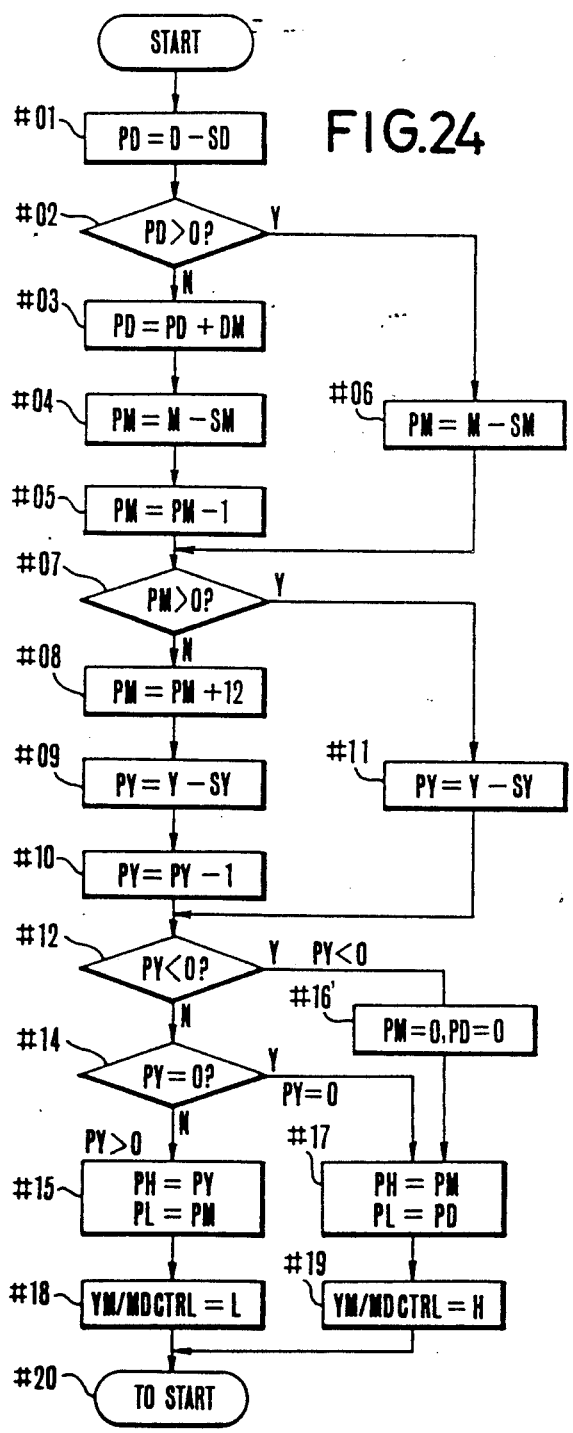

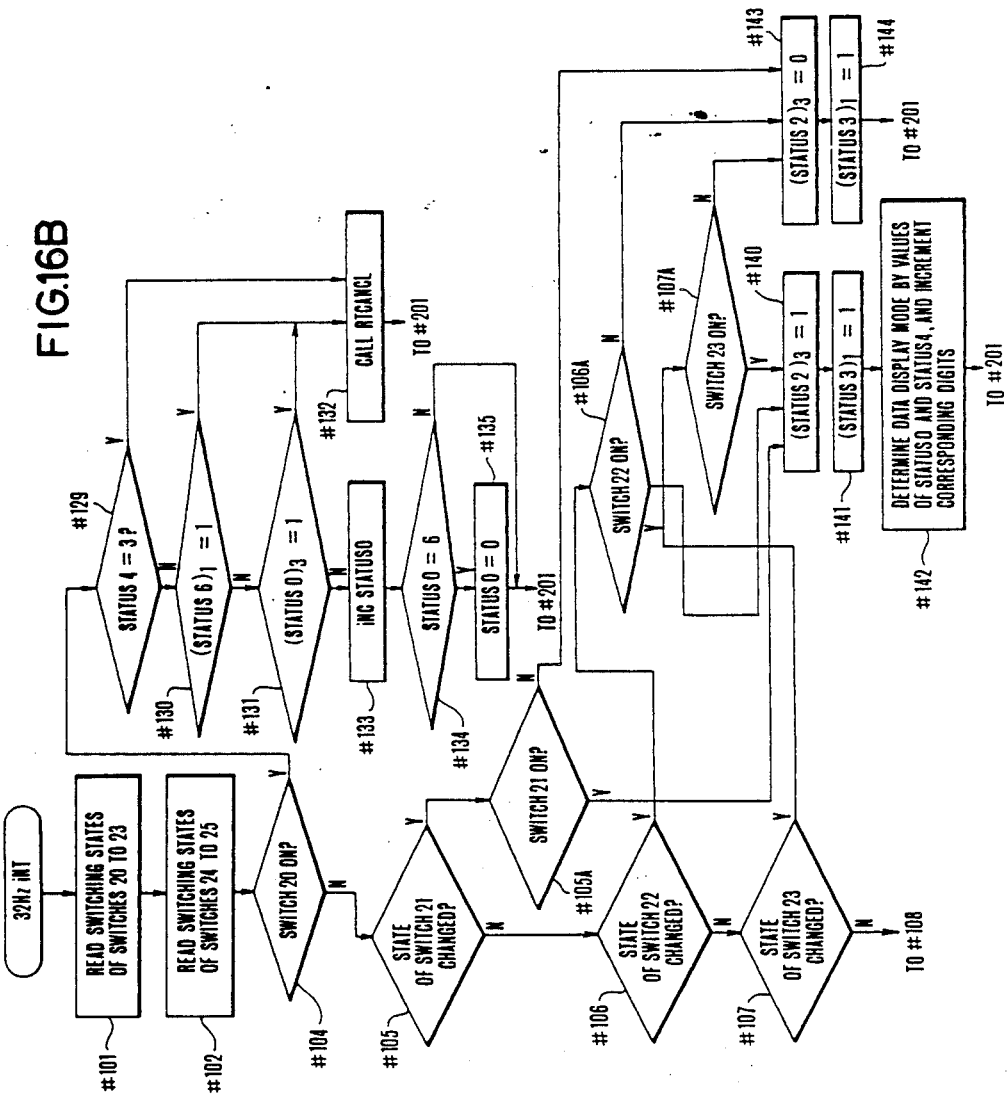

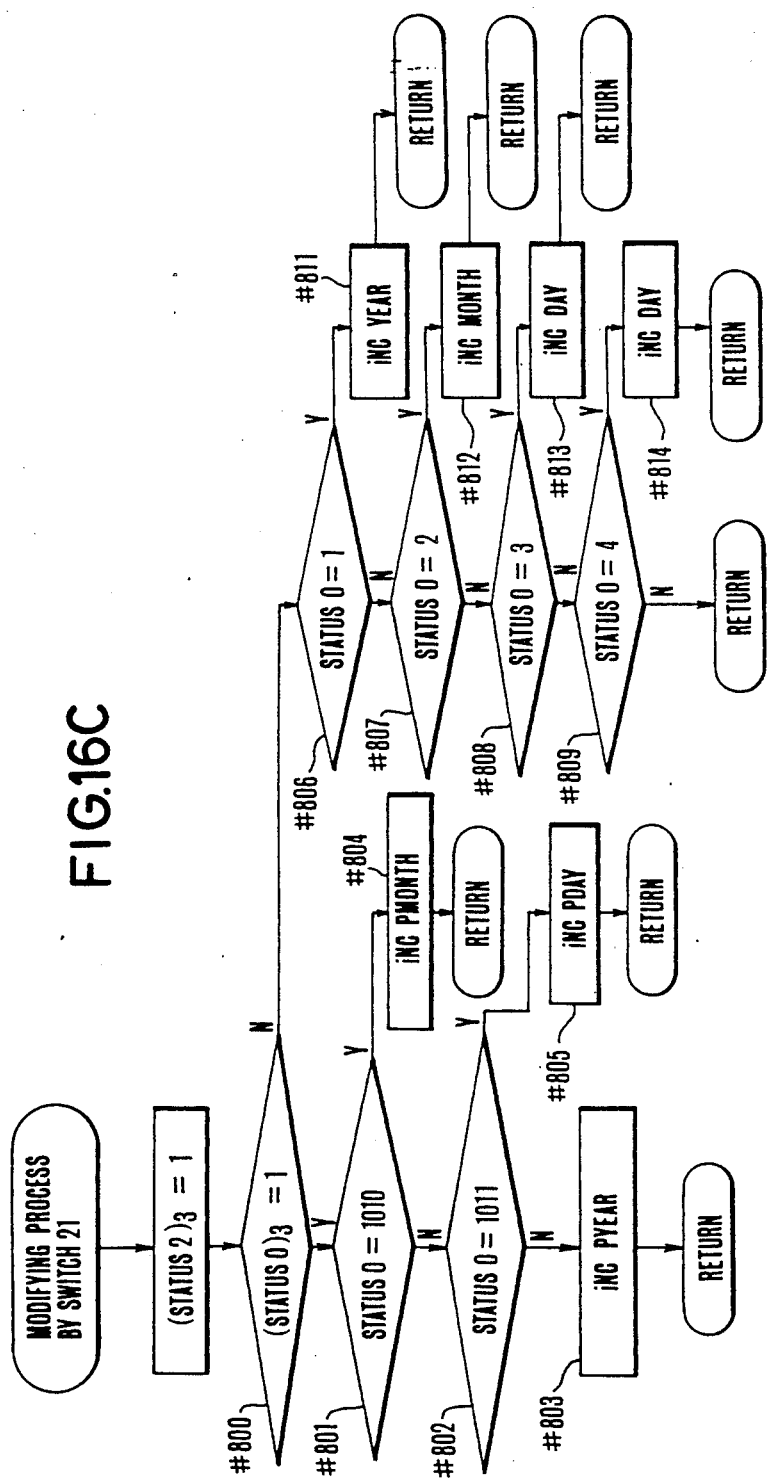

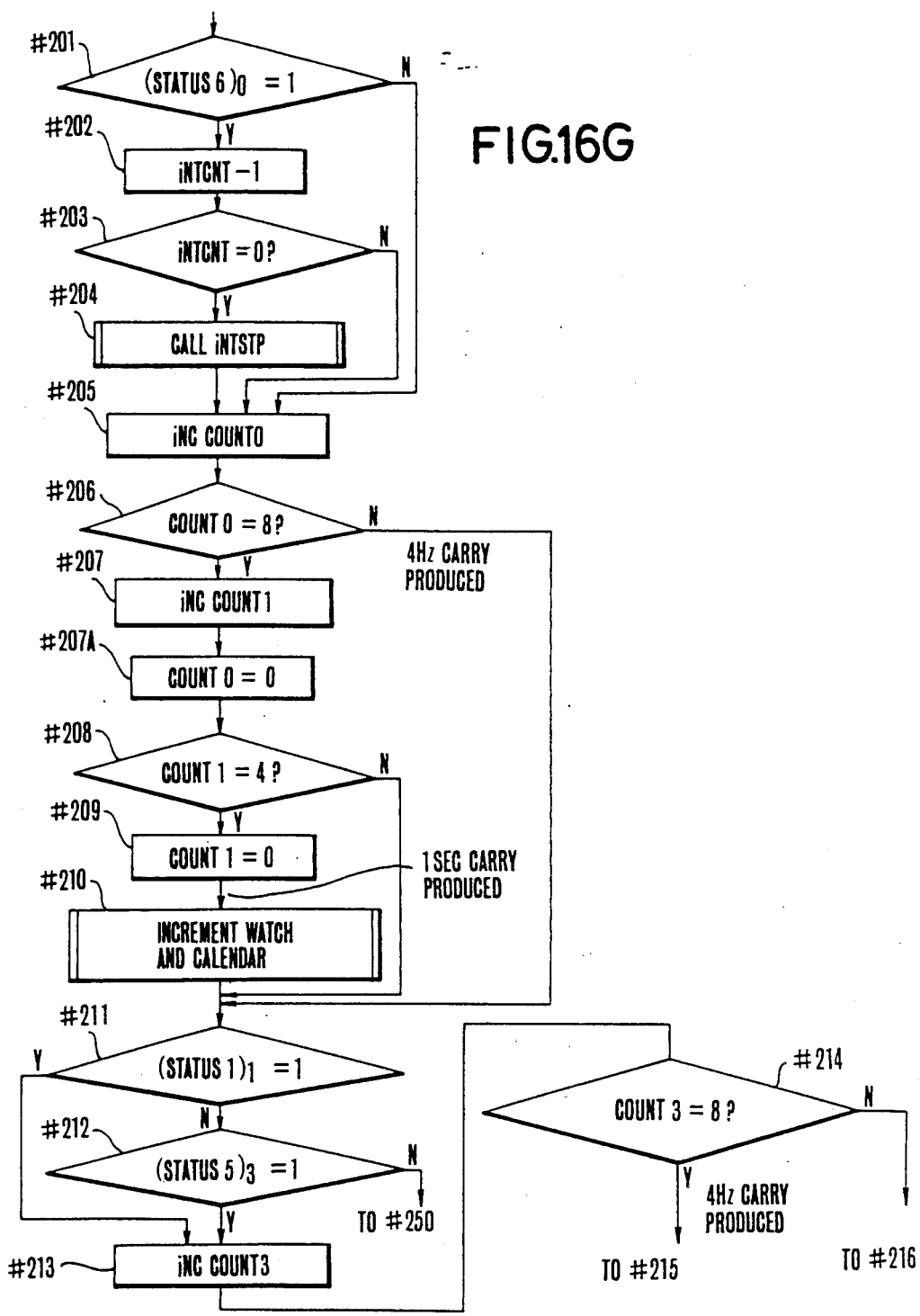

CAMERA

This application is a continuation of application Ser. No. 186,101 filed Apr. 25, 1988, now abandoned.

BACKGROUND OF THE INVENTION

1. Field of the Invention

The present invention relates to a camera, and more particularly, to a camera comprising a data imprinting means that can imprint any data on a film as photosensitive means, and a means for displaying the data.

2. Description of the Related Art

The conventional cameras of this type have been inconveneint in that they could display and imprint only the photographing date or time in the form of "year/month/day" or "day/hour/minute", respectively, and that in order to display or imprint the lapse of time starting from any specified date for the purpose of recording the growth of a child, animal or plant, it was necessary to provide each of them with an expensive interchangeable back cover or the like comprising a capability of setting any arbitrary data. In addition, these cameras have presented a disadvantage of low operability, because it was necessary to enter any lapse of time in them as required.

SUMMARY OF THE INVENTION

The present invention is provided under these circumstances. Therefore, the first object of the present invention is to provide a camera which can calculate the lapse of time from any specified date (month and day) to the current date (month and day) automatically, and display and imprint the calculated lapse of time, so as to permit recording the growth of a child, animal or plant at ease and with lower costs.

The second object of the present invention is to provide a camera of the above type which comprises determining means for determining whether the data of any time lapse is shorter than a year or not shorter than a year, and digital display means for indicating the time lapse in the first format of months and days corresponding to the time lapse of shorter than a year, or in the second format of years and months corresponding to the time lapse of not shorter than a year, so as to provide a legible display of time lapse data.

The third object of the present invention is to provide a camera of the above type which comprises time lapse calculating means for calculating the lapse of time from any specified reference date (month and day) to the current date (month and day) by substracting the reference date from the current date (provided that the months, January to December, in a year are represented by the numbers, 1 to 12, respectively), and time lapse correcting means for correcting the calculated lapse of time by substracting one past month from the calculated lapse of time and adding to the calculated lapse of time the remaining days after reference day in the reference month containing the reference day, if the result of substracting the reference date from the current date by using the calculating means is negative, the time lapse correcting means comprising means for varying the days to be added to the calculated lapse of time, if the reference month is February, according to the result of determining whether the year containing the reference month, February, is a leap-year or not, so as to provide an accurate calculation of the lapsed period of time at any time.

The fourth object of the present invention is to provide a camera of the above type which permits digital display means to display any time lapse data if the data from calculating means is a positive value representing a correct lapse of time, or to be reset to zero (0) or to provide a warning display if the data from the calculating means is a negative value, so as to inform the user of the camera immediately that his operation of setting the reference date (month and day) was erroneous.

The fifth object of the present invention is to provide a camera of the above type which permits use of a single switch both for mode selection and for display format selection in the same mode, so as to improve the operability of the camera and to reduce the costs of the camera.

The sixth object of the present invention is to provide a camera of the above type which comprises display means having the required minimum number of segments, in addition, to the seven (7) conventional segments in the form of "8", to be able to form and display the two lower-case letters, "m" and "y", so as to provide a recognizable display of "month" and "year" in the lapsed period of time at lower costs.

The other objects and features of the present invention will be understood by reading the description of the preferred embodiments according to the present invention.

BRIEF DESCRIPTION OF THE DRAWINGS

FIGS. 5 to 14 are views illustrating the displays of monitor LCDs respectively.

FIG. 20 is a table listing the inputs and outputs of the I/O ports on the central processing unit (CPU) in the calculator as shown in FIG. 19.

FIG. 21 is a table listing the outputs from the "end of month" correcting circuit 116 in the calculator as shown in FIG. 19.

FIG. 22 is a flow charts showing a program run in the CPU 101 as shown in FIG. 19.

FIG. 24 is a flow chart showing a partial modification of the flow chart as shown in FIG. 22.

DETAILED DESCRIPTION OF A THE PREFERRED EMBODIMENTS

A preferred embodiment of system according to the present invention will be described below in reference to FIGS. 1 to 18C.

Figure 3:
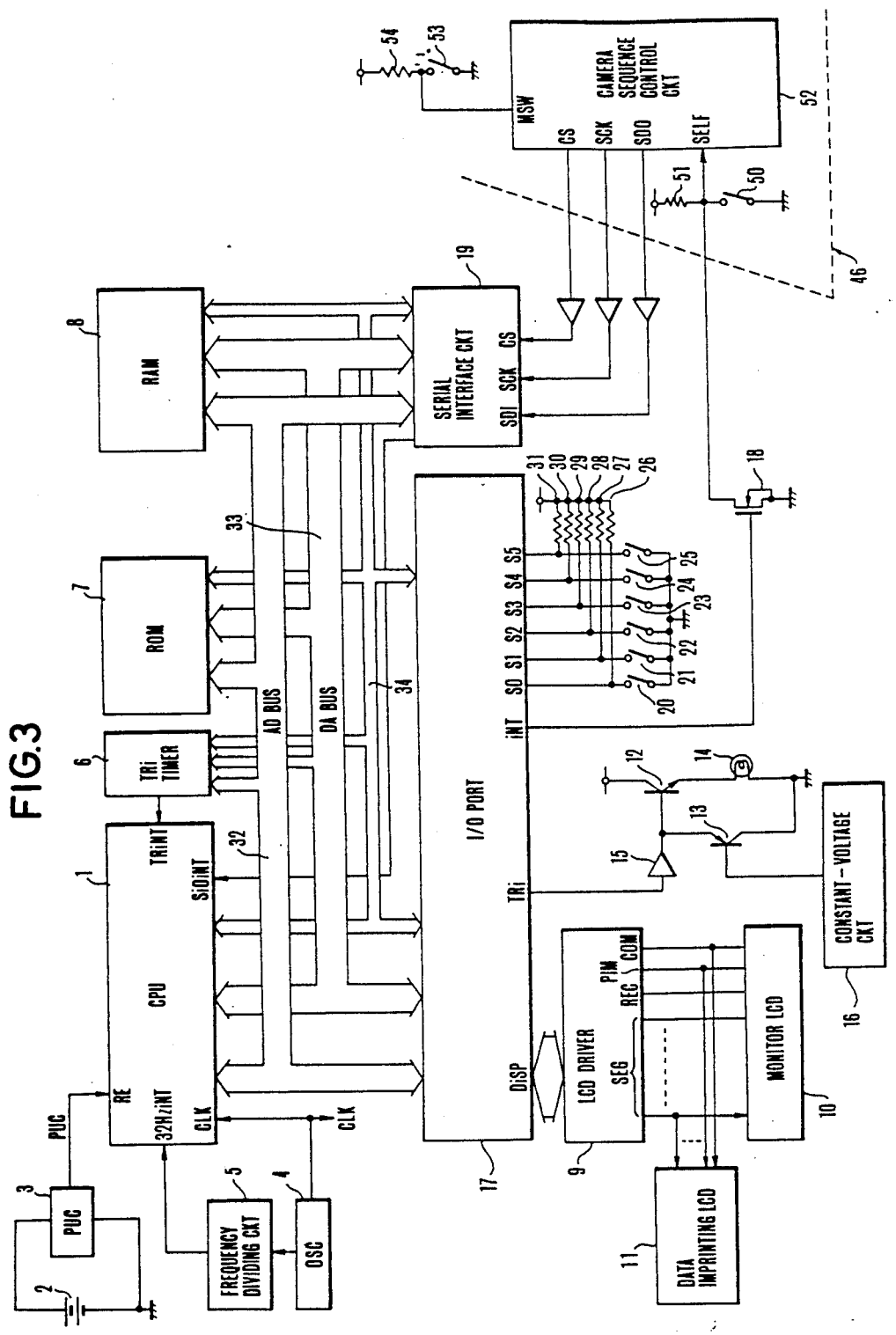
FIG. 3 is a block diagram showing the electronic control circuit of the camera.
Figure 4:
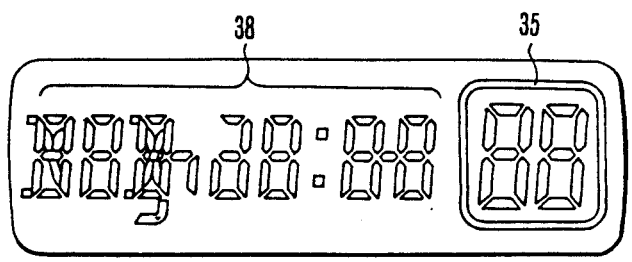
FIG. 4 is a layout of monitor LCD segments.
Figure 5:
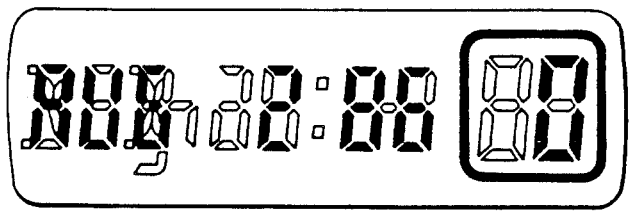
Figure 6:
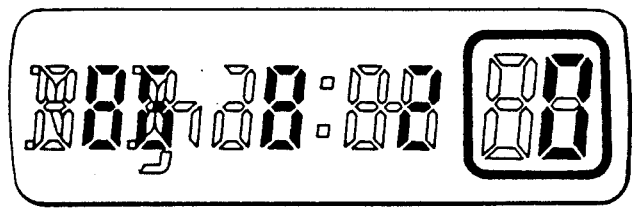

FIG. 3 is a block diagram showing the circuit configuration of a data imprinting device with an interval timer facility.

In this figure, the part on the right side relative to the disconnecting line shows a control circuit contained in the camera body 46. 1 is a central processing unit (hereinafter referred to as CPU) the in a microcomputer which provides the sequence control for the operation of the entire system according to the present invention as well as the change and time counting of a watch and calendar and the control of timers. 3 is a PUC circuit which delivers a powerup clear signal when a battery 2 of the camera is switched on. When this signal enters the RESET (RE) terminal of the CPU 1, the CPU 1 is reset. 4 is an oscillator which generates reference clock pulses (CLKs). When this signal enters the input terminal CLK in the CPU 1, all the operations of circuits in this system are synchronized. 5 is a frequency dividing circuit which divides the frequency of the CLK pulse into 32 Hz in this embodiment, which enters the 32 Hz iNT terminal of the CPU 1. 6 is a TRi timer which counts the lighting time of a data imprinting lamp 14. When the count reaches zero (0), the TRi timer 6 enters an interrupt signal TRiNT into the CPU 1. 7 is a ROM which stores the contents of a program. 8 is a RAM which reads out and writes in data.

10 is a monitor LCD. 11 is a data imprinting LCD. The two LCDs are mounted inside the back cover 45 of the camera, and display the data imprinting information, the operation of the interval timer, the data imprinting recognition (REC) mark 37, the photographing information (PIM) mark 36, etc. with the signals from the segment (SEG) terminals, common (COM) terminal, REC terminal and PIM terminal on an LCD driver 9.

A data imprinting circuit is connected to the base of a transistor 12 and the emitter of a transistor 13 through a buffer 15 connected to the TRi terminal of an I/O port 17, the two transistors 12 and 13 being used to drive the data imprinting lamp 14. The transistor 12 comprises a collector connected to the positive pole of a power battery and an emitter connected to one of the terminals on the data imprinting lamp 14. The transistor 13 comprises a base connected to the output terminal of a constant-voltage circuit 16 to drive the lamp 14 with the constant voltage, and an emitter grounded together with the other terminal of the lamp 14.

An N-channel MOS transistor 18 is connected to the iNT terminal of the I/O port 17. This MOS transistor 18, turned on, can apply a low level to the SELF terminal of a camera sequence control circuit 52 when a self-timer switch 50 on the camera body 46 is set to ON. When the MOS transistor 18 and the self-timer switch 50 are set to OFF, the SELF terminal is pulled up by a pull-up resistor 51 to a high level.

19 is a serial interface circuit which receives information from the camera body 46. The chip select (CS) terminal, serial clock (SCK) terminal and serial data input (SDI) terminal of the serial interface circuit 19 are connected separately to the camera sequence control circuit 52. The serial interface circuit 19 is also connected to the SiOiNT terminal of the CPU 1 to deliver an interrupt signal to the CPU 1 with a serial code entered in the circuit 19.

On the I/O port 17, terminals S0, S1, S2, S3, S4 and S5 are connected to a data imprinting mode selector switch 20, imprinting data and interval timer time modifying switches 21, 22 and 23, a time lapse imprinting mode selector switch 24 and an interval timer mode switch 25, respectively, and also connected to pull-up resistors 26, 27, 28, 29, 30 and 31 respectively to be pulled up.

The CPU 1, the TRi timer 6, the ROM 7, the RAM 8, the I/O port 17 and the serial interface circuit 19 are connected with each other through an address bus 32 which transfers program addresses, a data bus 33 which transfers and receives data, and a control bus 34 which controls the timing of the address and data transfer.

53 is the main switch of the camera body, which is pulled up by a pull-up resistor 54 when it is in OFF, and connected to the main switch (MSW) terminal on the camera sequence control circuit 52.

Figure 1:
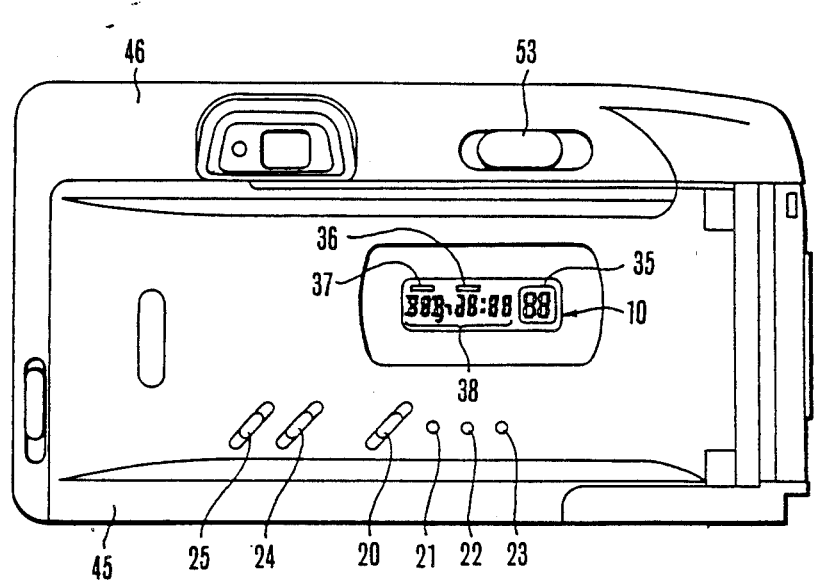
FIG. 1 is a back view of a camera according to the present invention.
Figure 2:
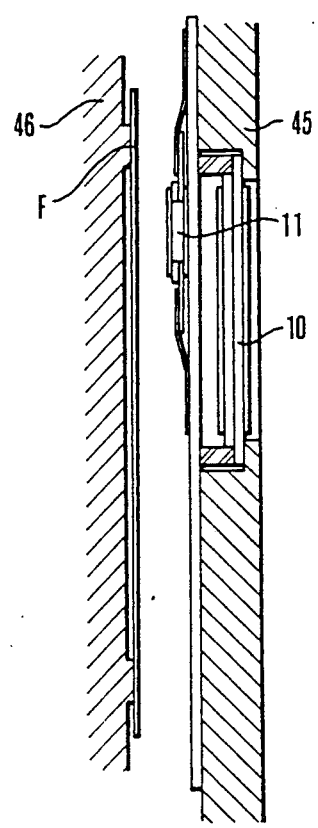
FIG. 2 is a cross-sectional view showing the main part of the dating mechanism on the back side of the camera.

FIG. 1 is a back view of the camera, and FIG. 2 is the cross-sectional view showing the main part of the camera back portion.

In FIGS. 1 and 2, 45 is the back cover of the camera, which is placed and designed so that the monitor LCD 10 can be viewed on the back side of the camera and that the switches 20 to 25 can be operated there. This monitor LCD 10 comprises a film counter display section 35, a camera body operation indicating mark 36, a data imprinting recognition mark 37, and display section 38 to recognize the imprinting data selected by the switches 20 to 25.

On the inside of the back cover 45 is placed the data imprinting LCD 11 connected in series to the monitor LCD 10. The data displayed on the data imprinting LCD 11 are to be imprinted by the data imprinting lamp 14 on the surface of a film F serving as photosensitive means placed in the camera body 46.

The operation of this embodiment thus configured and constructed will be described below.

At first, the display of the imprinting data recognition display section 38 as well as the display in the interval timer mode and the display in the time lapse imprinting mode will be described.

Concerning the display of the imprinting data recognition display section 38, this display section 38 displays selectively the calendar data in the forms of "year/month/day", "month/day/year", "day/month/year" and "day/hour/minute" as well as the "film exposed-frame number information imprinting mode" (hereinafter referred to as FC mode) and "imprinting OFF mode" in this order each time when a data imprinting mode selector switch 20 is turned on. This display section 38 has a segment layout to display any of the abbreviated month names in English, and by operating the switch 20, permits the display of any English month name (FIG. 5) as well as any month name in numerical form (FIG. 6) selectively. If any calendar information such as "year/month/day", "month/day/year", "day/month/year" or "day/hour/minute" is displayed on the display section 38, each display may be incremented by operating the imprinting data modifying switches 21, 22 and 23.

Concerning the interval timer mode, when the interval timer mode switch 25 is turned on, the display section 38 is switched from the data imprinting mode into the interval timer mode and displays in hour and minute the time Ti which passes from the pressing of the release button to the generation of a release signal (FIG. 9). Such display may be modified by means of the modifying switches 22 and 23.

When the interval timer mode switch 25 is turned on again, the display section 38 starts the operation as the countdown timer by adding the data in second, as shown in FIG. 10, if the main switch 53 on the camera body 46 is set in ON. If the main switch 53 on the camera body 46 is in OFF, however, the display section 38 is switched into the display format which had been provided before it was switched into the interval timer mode, and does not provide the countdown information any more. Operating as the countdown timer, the display section 38 then recovers the display format which had been provided before it was switched into the interval timer mode (for example, FIGS. 5 to 7), 10 seconds before the release is operated, and the CPU 1 transmits a self-timer startup signal to the camera body 46.

When the signal indicating that the release is operated enters the CPU 1 through the serial interface circuit 19, the display section 38 starts to operate again as the countdown timer on countdown-displaying the time Ti in seconds. If the release end signal does not enter the CPU 1 within the predetermined time after the self-timer started up, the interval timer mode is cancelled, and the display section 38 recovers the display format which had been provided before it was switched into the interval timer mode, and does not provide the countdown display any more. If any release signal enters the circuit of this display section 38 from the camera body during the counting-down by the interval timer, or if the data imprinting mode selector switch 20 is turned on during the countdown operation, the countdown operation is stopped and the display section 38 recovers the display format which had been provided before it was switched into the interval timer mode.

Concerning the time lapse imprinting mode (hereinafter referred to as "PA mode"), the display section 38 is switched into the time lapse display mode despite of providing the previous display format in data imprinting mode, when the time lapse imprinting switch 24 is turned on.

When the switch 24 is in ON, the date "year/month/day" from which the lapse of time is counted is displayed (FIG. 11). While this switch 24 is being pressed down, the starting date (year/month/day) may be modified by means of the modifying switches 21 to 23.

The date "year/month/day" is displayed in the format which had been provided before the display section 38 is switched into PA mode, if it is possible. If it is impossible, for example, if the display has been in the format "day/hour/minute" in imprinting mode, or if the display section 38 has been in "FC mode" or "imprinting OFF mode", the date "year/month/day" is displayed in numerical format as shown in FIG. 11.

Next, when the switch 24 is turned off, the lapse of time (the current date to the count starting date) ΔT is displayed, and it is imprinted when the date signal from the camera body 46 enters the circuit of the display section 38.

It is understood that the lapse of time ΔT is updated as the current date is updated.

Figure 12:
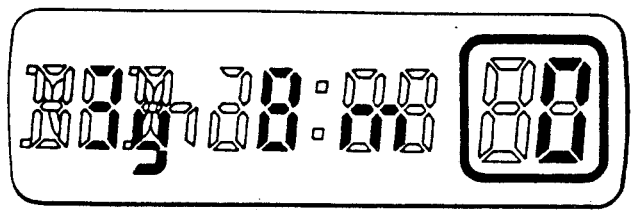
Figure 13:
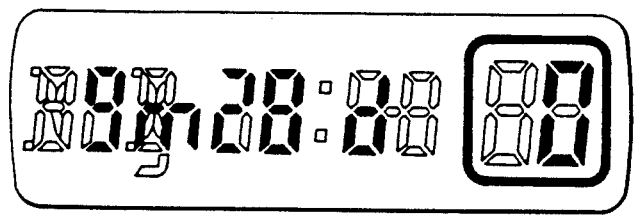
Figure 14:
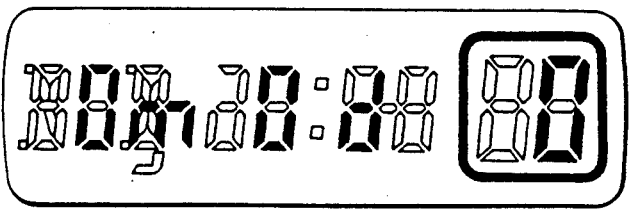

The display format on the display section 38 is "year/month" (in the display form of "XyXm" wherein X denotes a numeral, y denotes the year and m denotes the month.) for ΔT>12 months (FIG. 12), "month/day" (in the display form of "XmXd" wherein d denotes the day.) for ΔT≦12 months (FIG. 13), and "0 month/0 day" (in the form of "OmOd" for ΔT≦0 (FIG. 14), as shown in FIGS. 12 to 14.

Incidentally, the above small letters "y" and "m" are displayed by using an auxiliary segment which extends straight from one segment of plural digits arranged in the form of "8" and comprised of seven segments and is bent about at a right angle halfway, as shown in FIGS. 12 to 14.

When the data imprinting mode selector switch 20 is turned on, the display section 38 recovers the current-date format which had been provided before it was switched into the PA mode, in whatever format the display has been.

By using the film exposed-frame number imprinting mode (FC mode), the interval timer mode and the PA mode in combination, it is possible to imprint information on the date and time, film frame number and the number of days selectively on the photos recorded on films at fixed intervals of time, so that the photography records and pictures will be very easily arranged.

Next, the input unit which receives the information from the camera body 46 through the serial interface circuit 19 in this embodiment of the system will be described below.

In this embodiment, the data imprinting signal, the film frame counter information, and other camera information, from the camera body 46 through the serial interface circuit 19 enter the input unit. As shown in Table 1, the 16-bit serial data comprising D0 to D3 of 4 bits each is transferred from the camera body 46 in this transmission format. D0 and D1 are BCD codes corresponding to the higher place and lower place of two digits on the film frame counter respectively. D2 is the data imprinting signal and camera information. D2 is a data imprinting signal (also, a release signal) when bit 3 (MSB) is 1, and the data imprinting lamp lighting time may vary from $t_0$ to $t_7$ msec according to the values of the low order bits (bit 2, bit 1 and bit 0). When bit 3 in D2 is 0, the photography information mark (PIM mark) is turned on for bit 2=1 and turned off for bit 2=0. If bit 3 is 0, the main switch 53 of the camera is in ON for bit 1=1 and in OFF for bit 1=0. If bit 3 is 0, the main switch 53 is latched in the previous state. D3 is 4 spare bits.

TABLE 1

| D0 MSB LSB **** | D1 MSB LSB **** | D2 MSB LSB **** | D3 MSB LSB **** |
|---|---|---|---|
| High-order Place of 2 digits on counter | Low-order place of 2 digits on counter | Data imprinting signal and camera information<br>0XXX: No imprinting<br>1000: $t_0$ msec<br>1001: $t_1$ msec<br>1010: $t_2$ msec<br>1011: $t_3$ msec | Spare bits |

TABLE 1-continued

| D0 MSB LSB •••• | D1 MSB LSB •••• | D2 MSB LSB •••• | D3 MSB LSB •••• |
|---|---|---|---|
| | | 1100: $t_4$ msec | |
| | | 1101: $t_5$ msec | |
| | | 1110: $t_6$ msec | |
| | | 1111: $t_7$ msec | |
| | | 01XX: PIM mark ON | |
| | | 00XX: PIM mark OFF | |
| | | 0X1X: Camera body main switch 53 ON | |
| | | 0X0X: Camera body main switch 53 OFF | |

TABLE 2-1

RAM
$b_3$ ... MSB of 4 bits
$b_0$ ... LSB of 4 bits
— ... not used

| Address label | Contents |
|---|---|
| STATUS0 | MSB = "1" ... Any display except for those in normal mode 3 low-order bits: |
| | = "000" ... Imprinting OFF mode |
| | = "001" ... "year/month/day" mode |
| | = "010" ... "month/day/year" mode |
| | = "011" ... "day/month/year" mode |
| | = "100" ... "day/hour/minute" mode |
| | = "101" ... Film frame counter mode |
| STATUS1 | $b_3$ = 1 ... TRi port = H output state |
| | $b_2$ = 1 ... Interval timer waiting state |
| | $b_1$ = 1 ... Interval timer operating state |
| | $b_0$ = 1 ... — |
| STATUS2 | $b_3$ = 1 ... Data modifying state |
| | $b_2$ = 1 ... — |
| | $b_1$ = 1 ... Reference date setting state in PA mode |
| | $b_0$ = 1 ... Interval timer time setting state |

TABLE 2-2

| Address label | RAM Contents |
|---|---|
| STATUS3 | $b_3$ = 1 ... — |
| | $b_2$ = 1 ... — |
| | $b_1$ = 1 ... LCD display change request flag |
| | $b_0$ = 1 ... — |
| STATUS4 | $b_3$ = 1 ... PA data imprinting mode in interval timer mode |
| | 3 low-order bits: |
| | = "001" ... — |
| | = "010" ... Reference date display in PA mode |
| | = "011" ... Time lapse display in PA mode |
| | = "100" ... Interval timer setting display |
| | = "101" ... Countdown display during the interval timer operation |
| STATUS5 | $b_3$ = 1 ... REC port = H output state |
| | $b_2$ = 1 ... — |
| | $b_1$ = 1 ... — |
| | $b_0$ = 1 ... — |

TABLE 2-3

| Address label | RAM Contents |
|---|---|
| STATUS6 | $b_3$ = 1 ... — |
| | $b_2$ = 1 ... — |
| | $b_1$ = 1 ... State that the interval timer time has been counted down to 10 sec or less |
| | $b_0$ = 1 ... iNT port in H output state |
| SECOND0 | Low-order second digit of current time |
| SECOND1 | High-order second digit of current time |

TABLE 2-3-continued

| Address label | RAM Contents |
|---|---|
| MiNUTES0 | Low-order minute digit of current time |
| MiNUTES1 | High-order minute digit of current time |
| HOUR0 | Low-order hour digit of current time |
| HOUR1 | High-order hour digit of current time |
| DAY0 | Low-order day digit of current date |
| DAY1 | High-order day digit of current date |
| MONTH | Month number of current date |
| YEAR0 | Low-order year digit of current date |
| YEAR1 | High-order year digit of current date |

TABLE 2-4

| Address label | RAM Contents |
|---|---|
| PDAY0 | Low-order day digit of reference date in PA mode |
| PDAY1 | High-order day digit of reference date in PA mode |
| PMONTH | Month digit of reference date in PA mode |
| PYEAR0 | Low-order year digit of reference date in PA mode |
| PYEAR1 | High-order year digit of reference date in PA mode |
| QDAY0 | Low-order day digit of time lapse in PA mode |
| QDAY1 | High-order day digit of time lapse in PA mode |
| QMONTH | Month digit of time lapse in PA mode |
| QYEAR0 | Low-order year digit of time lapse in PA mode |
| QYEAR1 | High-order year digit of time lapse in PA mode |
| TRXM0 | Low-order minute digit of interval timer set-time |
| TRXM1 | High-order minute digit of interval timer set-time |
| TRXH0 | Low-order hour digit of interval timer set-time |
| TRXH1 | High-order hour digit of interval timer set-time |
| TRSEC0 | Low-order second digit on counter for interval timer |
| TRSEC1 | High-order second digit on counter for interval timer |
| TRMiN0 | Low-order minute digit on counter for interval timer |
| TRMiN1 | High-order minute digit on counter for interval timer |
| TRHOUR0 | Low-order hour digit on counter for interval timer |
| TRHOUR1 | High-order hour digit on counter for interval timer |

TABLE 2-5

| Address label | RAM Contents |
|---|---|
| SWX0 | $b_3$ = 1 ... Switch 23 in pressed state |

TABLE 2-5-continued

| Address label | RAM Contents |
|---|---|
| | $b_2 = 1$ ... Switch 22 in pressed state |
| | $b_1 = 1$ ... Switch 21 in pressed state |
| | $b_0 = 1$ ... Switch 20 in pressed state |
| SWY0 | $b_3 = 1$ ... — |
| | $b_2 = 1$ ... — |
| | $b_1 = 1$ ... Switch 24 in pressed state |
| | $b_0 = 1$ ... Switch 25 in pressed state |
| SiO3B | Read D3 of serial data |
| SiO2B | Read D2 of serial data |
| SiO1B | Read D1 of serial data |
| SiO0B | Read D0 of serial data |
| SiOC | Read the rising pulse count of serial clock |

TABLE 2-6

| Address label | RAM Contents |
|---|---|
| COUNT0 | Counter to count 32Hz (for watch) |
| COUNT1 | Counter to count 4Hz (for watch) |
| COUNT3 | Counter to count 32Hz (for interval timer) |
| COUNT4 | Counter to count 4Hz (for interval timer) |
| COUNT5 | Counter to count 32Hz |
| COUNT6 | Counter to count 4Hz |
| iNTCNT | Counter to count iNT port = H output time |
| FR0 | Low-order digit on film frame counter |
| FR1 | High-order digit on film frame counter |

The contents of the data memory of the RAM 8 will be described below in reference to Table 2, where the address label and the contents are placed left and right, respectively.

In STATUS0, $b_3$ (MSB)=1 indicates any displays other than normal data imprinting displays, such as PA mode and interval timer. The 3 low-order bits, $b_2$, $b_1$ and $b_0$, indicate normal data imprinting mode; imprinting OFF mode for "000", "year/month/day" mode for "001", "mont/day/year" mode for "010", "day/month/year" mode for "011", "day/hour/minute" mode for "100" and film frame counter imprinting mode for "101".

In STATUS1, $b_3=1$ indicates the TRi port=high (H) level output state. $b_2=1$ indicates that the interval timer has delivered the signal iNT port=H level and is in waiting state until it receives the status signal of the main switch 53 from the camera body 46. $b_1=1$ indicates the interval timer countdown operation. $b_0$ is not used.

In STATUS2, $b_3=1$ indicates that any data being modified by the switches 21 to 23 as shown in FIG. 1. $b_2=1$ is not used. $b_1=1$ indicates the reference date setting state in PA mode. $b_0=1$ indicates that the interval timer is in the time setting state.

In STATUS3, $b_1=1$ indicates the flag which requests a display that the LCD presentation changed. $b_3$, $b_2$ and $b_0$ are not used.

In STATUS4, $b_3=1$ indicates the PA mode data imprinting in interval timer mode. The 3 low-order bits, $b_2$, $b_1$ and $b_0$, are used to specify the display mode and the display type; reference data display in PA mode for "010", time lapse display in PA mode for "011", interval timer setting display for "100" and interval timer countdown display for "101".

In STATUS5, $b_3=1$ indicates that the REC port is in high (H) level state. $b_2$, $b_1$ and $b_0$ are not used.

In STATUS6, $b_1=1$ indicates that the interval timer has counted down the time to 10 sec or less. $b_0=1$ indicates iNT port=H level output state. $b_3$ and $b_2$ are not used.

SECOND0 to YEAR1 store the low-order second digit to the high-order year digit of the current date and time. PDAY0 to PYEAR1 store the low-order day digit to the high-order year digit of reference date in PA mode.

QDAY0 to QYEAR1 store the low-order day digit of the time lapse to the high-order year digit of the time lapse.

TRXM0 to TRXH1 indicate the low-order minute digit to the high-order hour digit of the interval timer set time, respectively. TRSEC0 to TRHOUR1 indicate the low-order second digit to the high-order hour digit of the interval timer countdown counter, respectively.

In SWX0, $b_3=1$ indicates the switch 23 being in pressed state, $b_2=1$ the switch 22 in pressed state, $b_1=1$ the switch 21 in pressed state, and $b_0=1$ the switch 20 in pressed state.

In SWY0, $b_1=1$ indicates the switch 24 being in pressed state, and $b_0=1$ the switch 25 in pressed state. $b_3$ and $b_2$ are not used.

SiO3B to SiO0B read and store the 4-bit of each of D3 to D0 of the serial data, respectively.

SiOC is a counter which counts the clocks as the serial codes enter it, and is reset when the buffers (SiO3B, SiO2B, SiO1B and SiO0B) complete the reading of said serial codes (D0, D1, D2 and D3).

COUNT0 and COUNT1 are 32 Hz and 4 Hz counters for the watch. COUNT3 and COUNT4 are 32 Hz and 4 Hz counters, respectively, for the interval timer. COUNT5 and COUNT6 are auxiliary 32 Hz and 4 Hz counters, respectively. iNTCNT is a counter which counts the iNT port output time with each interrupt signal 32 HziNT when the iNT port is in H level state.

FR0 and FR1 store the low-order and high-order digits in the film frame counter imprinting mode, respectively.

Now, the sequential operation of the microcomputer will be described below in reference to FIGS. 15A to 15D and FIGS. 16A to 16R, flow charts illustrating the software.

Figure 15A:
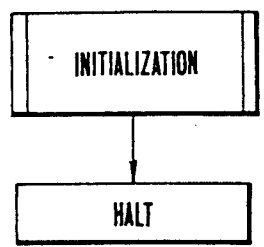
FIGS. 15A to 15D are flow charts illustrating the control software.
Figure 15C:
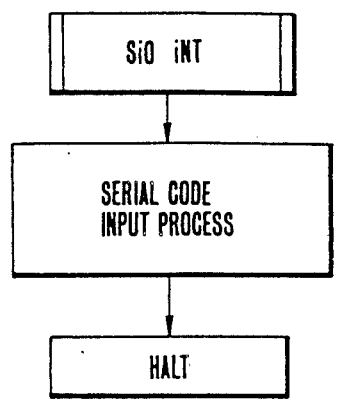
Figure 15B:
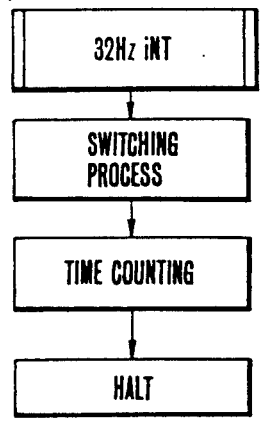
Figure 15D:
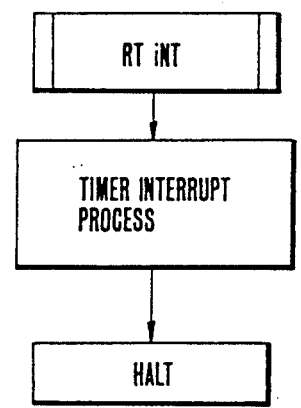

FIGS. 15A to 15D are the schematical flow charts of the program. This program is roughly divided in 4 blocks. The first block is for initialization, as shown in FIG. 15A. This block is used to clear the memory areas, to set the first display data and to adjust the display after the microcomputer has been powered on the reset. After the initialization was completed, the CPU 1 goes into a HALT state where the stored data are held in it. As shown in FIG. 15B, 32 HziNT is a processing sequence for the interrupt signals which are produced at the rate of 32 signals per second with the 32 Hz pulses transmitted by the frequency dividing circuit 5 as shown in FIG. 3. This sequence is used to monitor the switches 20 to 25 and process said signals in response to the pressed state of the switches 20 to 25, and to produce a carry signal of 1 second for incrementing the watch and calendar, when 32 interrupt signals are counted up. As shown in FIG. 15C, SiOiNT is a processing sequence for the serial interrupt signal which is produced when the CPU 1 receives the serial codes from the camera body 46, and it is used to process the input of the data imprinting lamp lighting and camera information. RTiNT as shown in FIG. 15D is a processing sequence for the timer interrupt signal which is generated when the TRi timer counts up, and it is used to process the data imprinting lamp lighting end time.

This embodiment according to the present invention will be described in detail in reference to the flow charts FIGS. 16A to 16R.

Figure 16K:
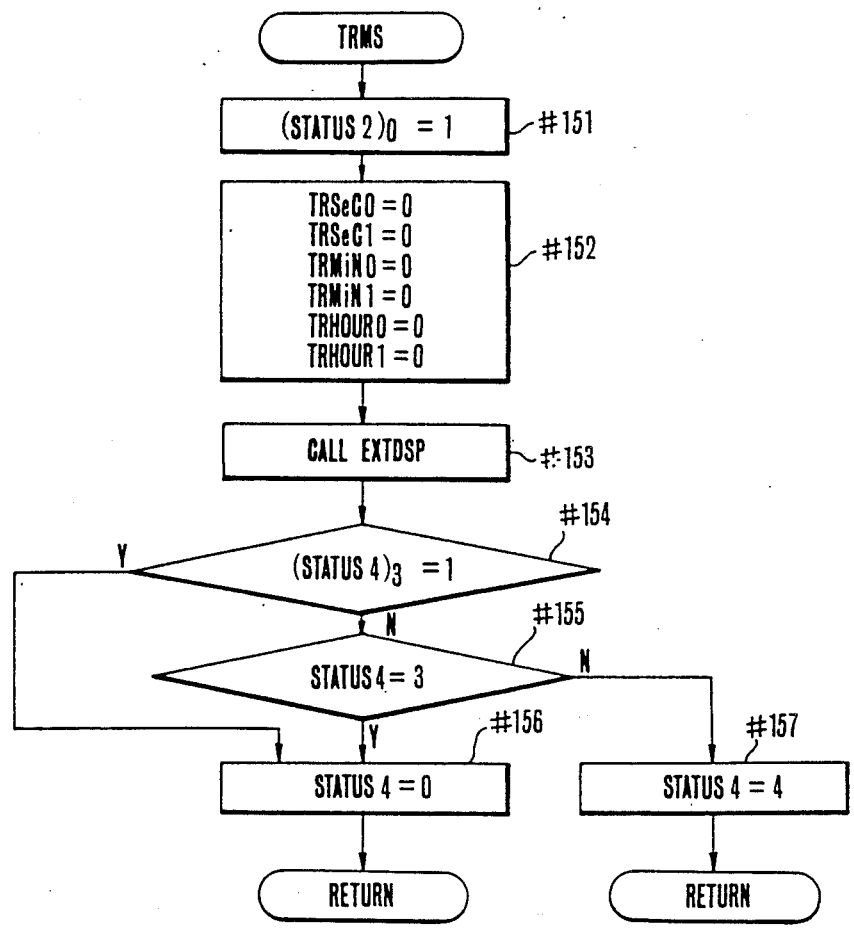
FIGS. 16A to 16R are detailed flow charts corresponding to the flow charts shown in FIGS. 15A to 15D.
Figure 16N:
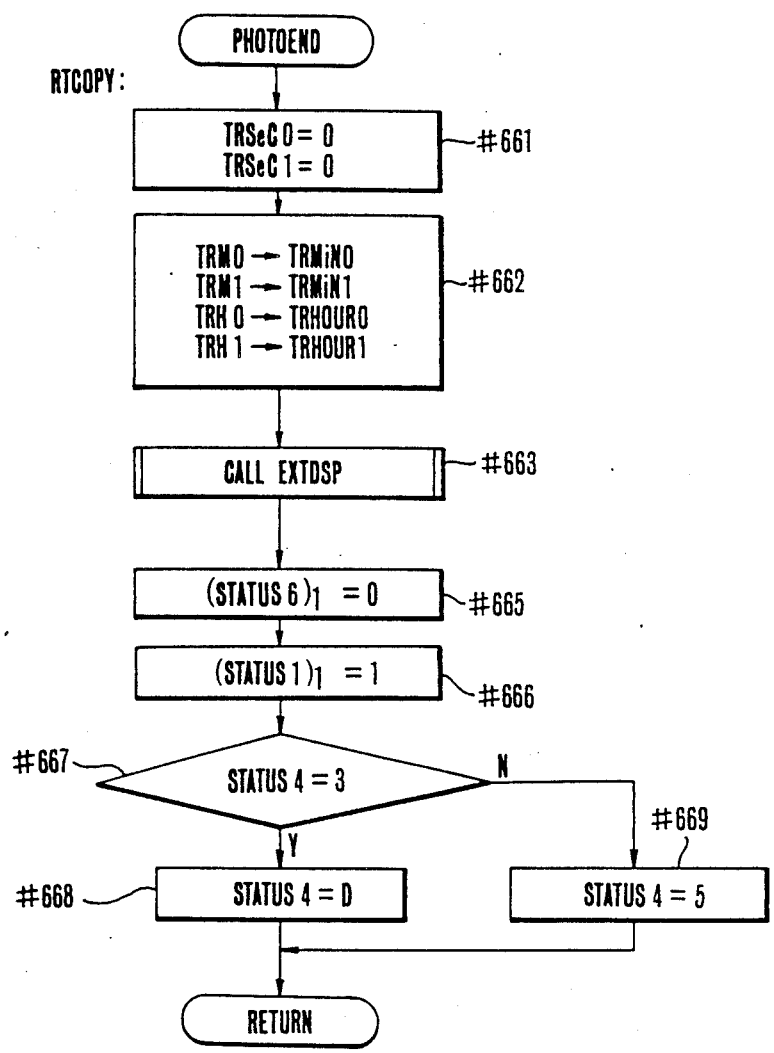
Figure 16A:
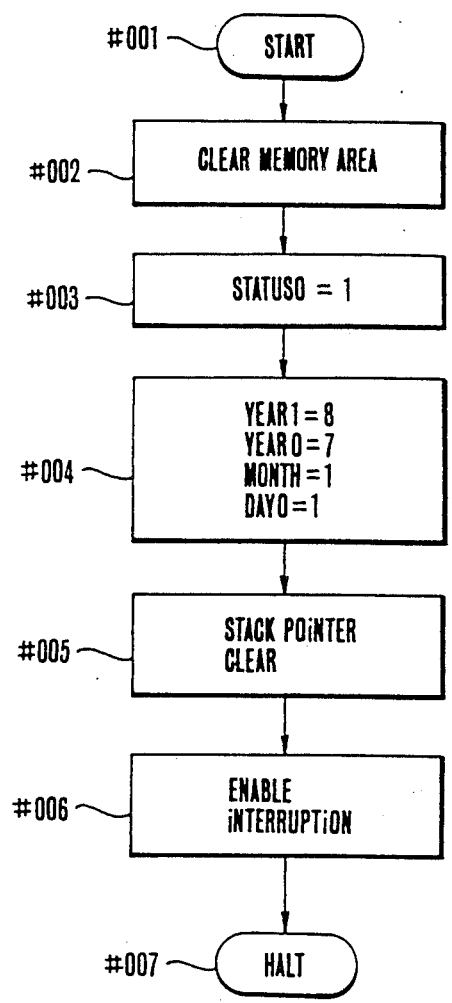

When the power supply 2 is turned on, the microcomputer is initially reset with the reset (RE) signal produced by the PUC circuit 3, and starts to operate from the program step #001 as shown in FIG. 16A. All the memory areas are cleared on Step #002, the data imprinting mode is switched from the initial display to the "year/month/day" mode on Step #003, and the calendar date is set, for example, to "Jan. 1, 87" on Step #004. On Step #005, the stack pointer area is cleared. The interruption is enabled on Step #006, and the microcomputer goes into a HALT state, that is, data holding state, on Step #007.

Figure 16D:
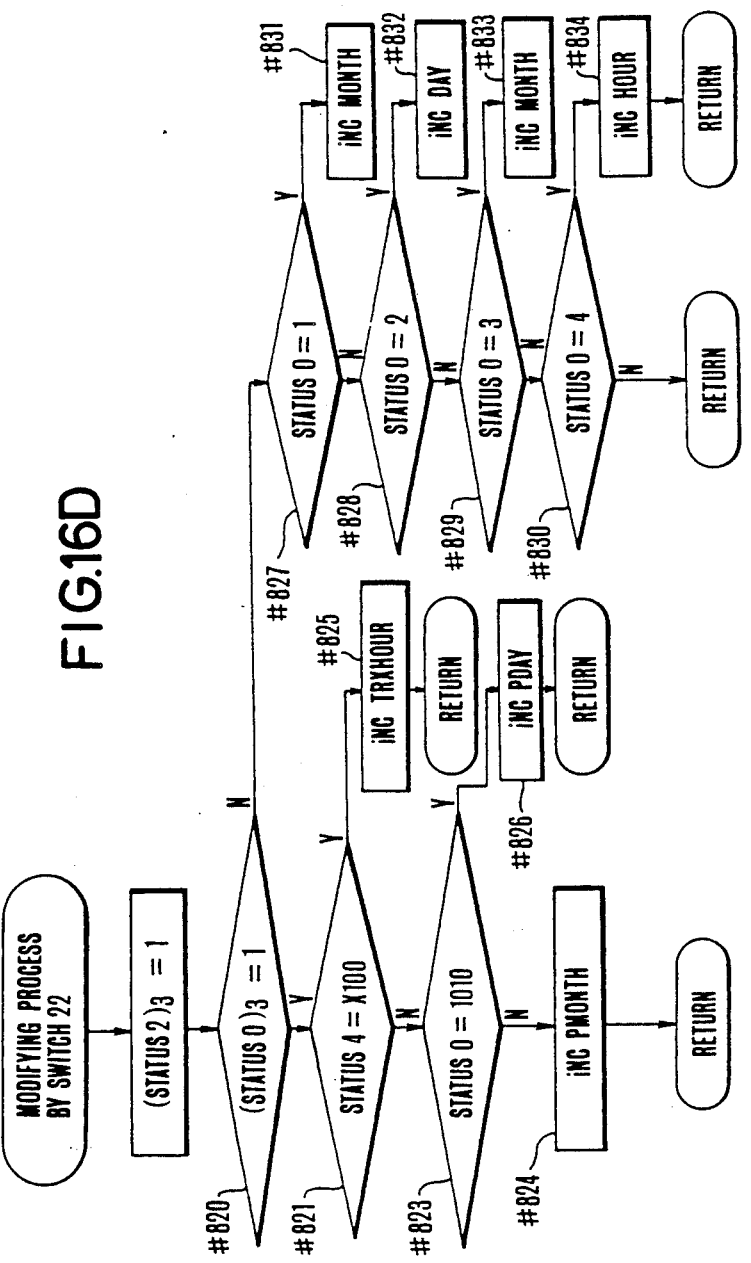
Figure 16E:
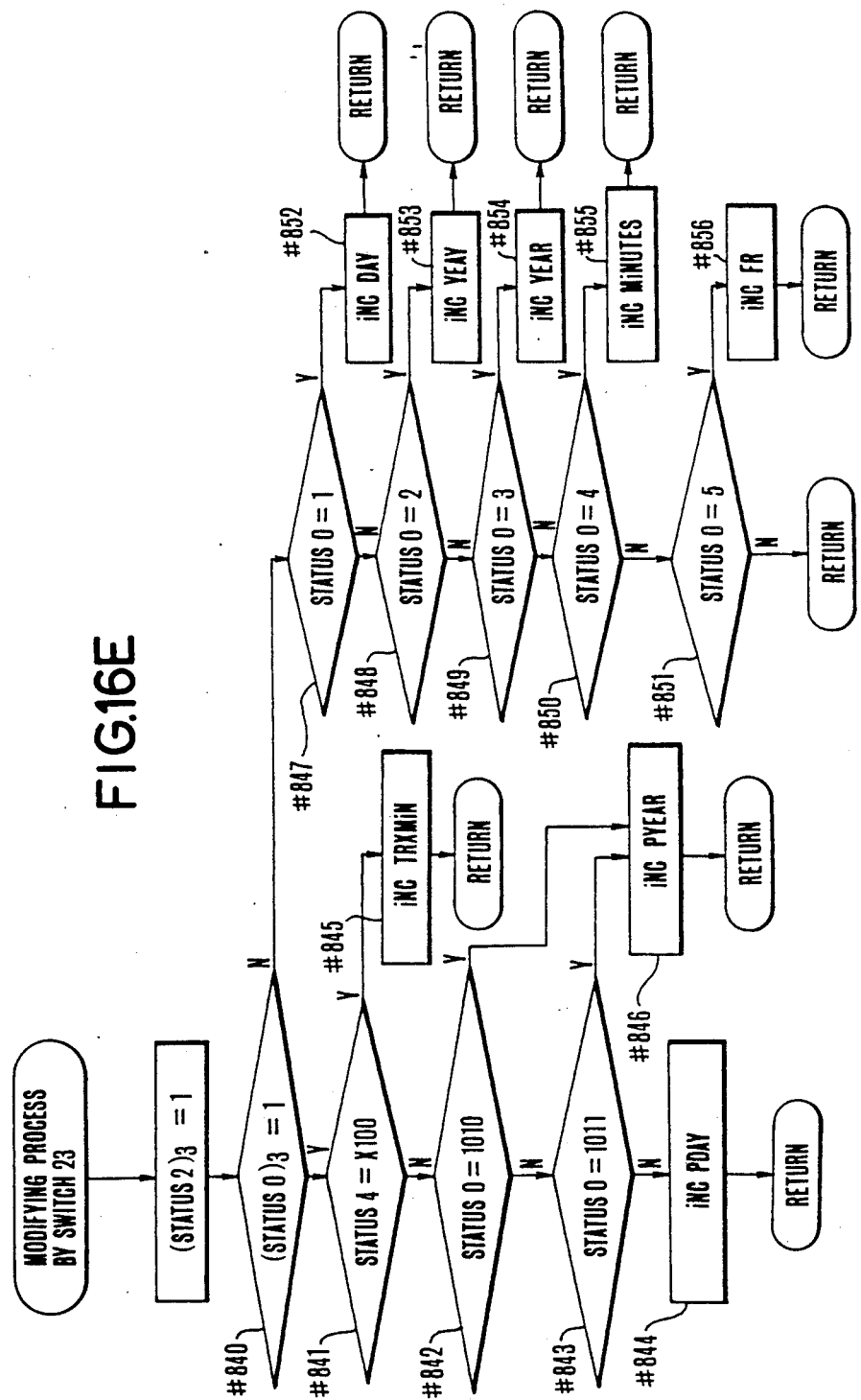
Figure 16F:
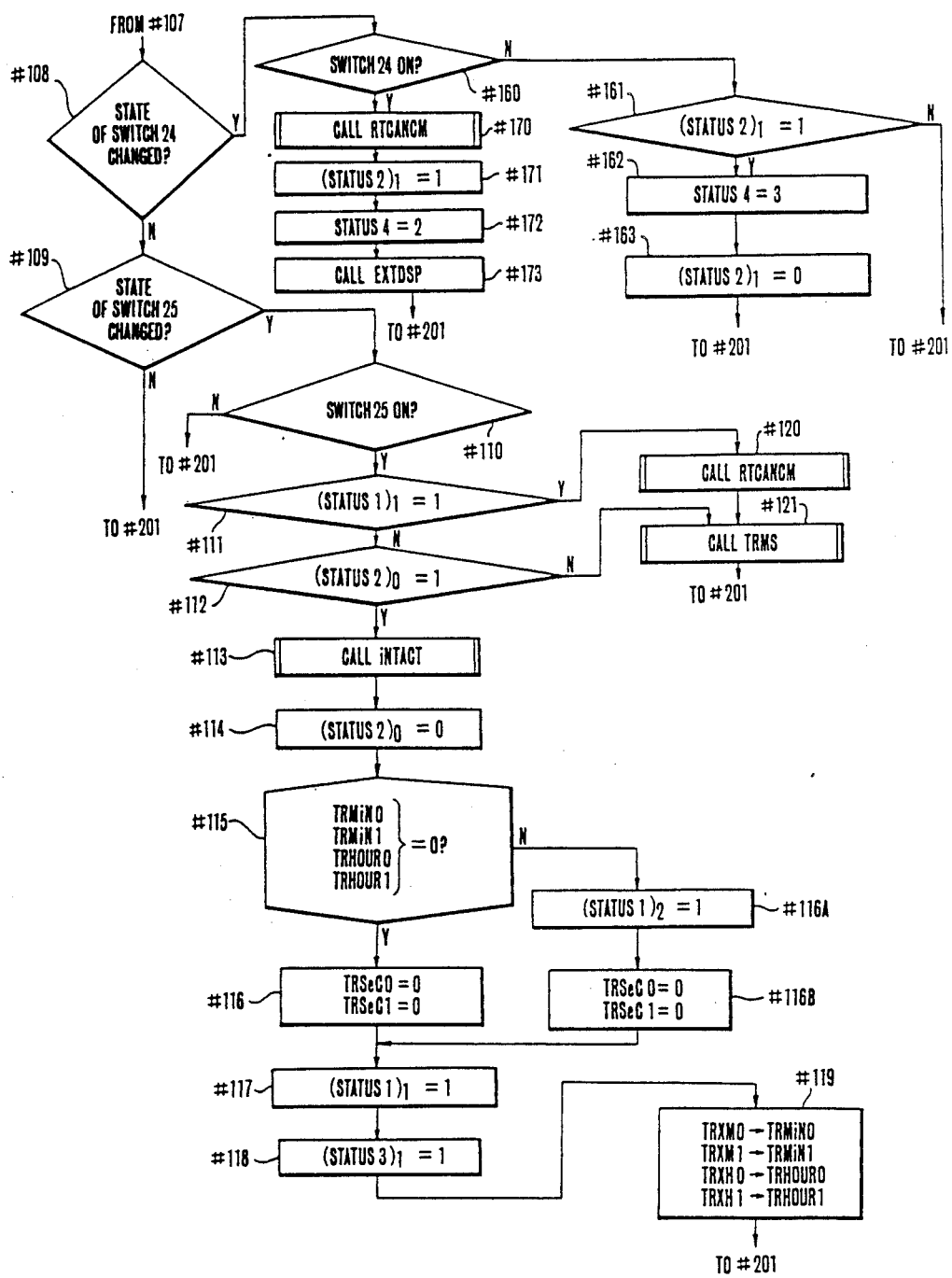

When the CPU 1 receives an interrupt signal 32 HziNT, the microcomputer starts in operation from Step #101, as shown in FIG. 16B. On Steps #101 and #102, the states of the switches 20 to 25 are read through the switch input port. Then, on Steps #104, #105, #106, #107, #108, and #109 (#108 and #109 are shown in FIG. 16F), it is determined whether the states of the switches 20 to 25 are changed or not, and if any change is detected, the required processing is made. The detailed information on this processing will be given hereinafter. If any switch is not changed in state, the control proceeds from Step #109 to Step #201 (FIG. 16G).

Here, the case will be described in which all the switches are pressed down.

At first, the case in which switch 20 is pressed down will be described below.

If the pressed state of the switch 20 is detected on Step #104, the control proceeds to Steps #129, #130, #131, #133, #134 and #135, and to Step #201. If it is detected at Step #129 that the time lapse display in PA mode is provided, or if it is detected on Step #130 that the time has been counted down to 10 seconds in the timer mode, the subroutine RTCANCL is called on Step #132 to cancel the PA mode or the timer mode. If the time is not counted down to 10 seconds, it is determined on Step #131 whether the display is in a normal mode or not. If the display is not in a normal mode, the subroutine RTCANCL is called on Step #132 as if the time is counted down to 10 seconds in the timer mode. The processing of the subroutine RTCANCL to cancel the timer will be described hereinafter. When the timer cancel subroutine has been processed, the control proceeds to Step #201.

If it is detected on Step #131 that the display is in a normal mode, STATUS0 is incremented by 1 on Step #133 to advance the data imprinting mode by one. If STATUS0=6 is detected on Step #134, STATUS0=0 is provided on Step #135, where 6 normal data imprinting modes, "year/month/day"→"month/day/year",→"day/month/year"→"day/hour/minute"→"FC mode"→"imprinting OFF mode", and cycled.

The case that the switches 21, 22 and 23 are pressed down will be described below.

If it is detected on Step #105 that the switch 21 is changed in state, the changed state of the switch 21 is determined on Step #105A. If the switch 21 is in a pressed state, $b_3=1$ (data modifying state) in STATUS2 is set on Step #140, and $b_1=1$ in STATUS3 (display change request flag) is set on Step #141 to update the display because of its contents change. Then, on Step #142, it is determined which data is corresponds to switch 21 according to the detection of the values in STATUS0 and STATUS4, and the corresponding data is modified. The detailed information will be provided hereinafter. After the modification has been completed, the control proceeds to Step #201.

If it is detected on Step #105A that the switch 21 is in an OFF state after the state was changed, $b_3=0$ in STATUS2 is set to reset the data modifying state, and $b_1=1$ in STATUS3 (disply change request flag) is set on Step #144. The states of the switches 22 and 23 are determined for any change on Steps #106 and #107, respectively, and subsequently processed as the state of the switch 21 is. Therefore, the processing of the switches 22 and 23 is not described here. After the modification has been completed, the control proceeds to Step #201 for the switches 22 and 23.

If the switch 24 is pressed down (see FIG. 16F), it is detected on Step #108 that the switch 24 is changed in state, and the changed state of the switch 24 is determined on Step #160. If it is detected that the switch 24 is in an ON state, the subroutine RTCANCM is called on Step #170. The subroutine RTCANCM will be described hereinafter. STATUS2 is set to the PA mode reference date setting state on Step #171, and set to the PA mode reference date display state on Step #172. On Step #173, the subroutine EXTDSP is called to control the displays in modes other than in the normal mode. Then the control proceeds to Step #201.

If it is detected on Step #160 that the switch 24 is in an OFF state after the change in state, it is determined on Step #161 whether it is in the PA mode reference date setting state or not. If it is in the setting state, the PA mode time lapse display mode is set on Step #162, and $(STATUS2)_1=0$ is set on Step #163 to cancel the PA mode reference date setting state. Then, the control proceeds to Step #201.

If the switch 25 is set in a pressed state, the change of the switch 25 is detected on Step #109, and the changed state of the switch 25 is determined on Step #110. If the switch 25 is in ON, it is determined on Step #111 whether the interval timer has been operated or not. If it is detected that the interval timer has not been operated, it is determined on Step #112 whether the interval timer is in the timer time setting state. If the interval timer is not in the time setting state, the control proceeds to Step #121 and then the Step #201. On Step #121, the subroutine TRMS is called to process the interval timer mode setting.

Here, the setting process in the interval timer mode will be described in reference to FIG. 16K.

On Step #151, STATUS is set at the interval timer time setting state. On Step #152, all the digit places, low-order second place to high-order hour place, of the counter watch for the timer are cleared to zero (0). On Step #153, the subroutine EXTDSP is called to process the displays in modes other than in the normal mode. This subroutine will be described hereinafter. On Step #154, it is determined if the data imprinting mode in interval timer mode is in the PA mode, or not. If the data imprinting mode is not in the PA mode, it is determined on Step #155 whether the display is in the PA mode time lapse display or not. If it is time lapse display, bit 3 and 2 in STATUS4 are set on Step #156 to the PA data imprinting mode and interval timer setting state, respectively. If bit 3 in STATUS4 is detected to be set on Step #154, the same operation is provided. If it is detected on Step #155 that the imprinting mode is not in the PA mode, the interval timer setting display state is set on Step #157.

After the interval timer mode setting has been completed, the control proceeds to Step #201. If the interval timer time setting state is detected on Step #112, the control proceeds to Steps #113 and #114, and the interval timer starts in operation. On Step #113, the subroutine iNTACT is called to set the iNT port into active state. The subroutine iNTACT starts from Step #731 (FIG. 16R). The signal iNT port=H is outputted on Step #731. On Step #732, the initial value of the iNTCNT counter for counting iNT port output time is set, and the flag of iNT port=H output is set on Step #733.

Next, the flag of interval timer time setting state is reset on Step #114, and on Step #115, it is determined whether all the digits in the interval timer are zero or not. If all the digits are zero, since the interval timer time has not been set, the interval timer is brought into a state of 10 second before counting up on Step #116 so that the self-timer of the camera body is used as the interval timer. The control comes into a state of waiting to receive a data imprinting signal from the camera body. On the other hand, if it is determined on Step #115 that the interval timer time is not zero, STATUS is set into a state of waiting to receive a main switch state signal (in serial code) from the camera body on the startup of the interval timer. The low-order and high-order second digit places of the interval timer are cleared to zero (0) on Step #116B. On Step #117, the interval timer operating state is set, and on Step #118, the display change request flag is set. On Step #119, the interval timer set time of low-order minute digit to high-order hour digit, which was stored on the startup of the timer, is copied in the RAM area which counts it down. Subsequently, the control proceeds to Step #201.

How to determine modes and modify data, if the switches 21, 22 and 23 are pressed down, will be described below in detail in reference to FIGS. 16C, 16D and 16E.

At first, the modification by the switch 21 will be described. In FIG. 16C, on Step #800, it is determined whether MSB in STATUS0 is set or not, and if it is set, it indicates any display in a non-normal mode. If the display is detected on Step #801 to be in the PA mode and in the form of "month/day/year", the switch 21 corresponds to the place "month". As a result, the "month" place PMONTH of the time lapse reference date is incremented on Step #804. If the display mode is "day/month/year", the switch 21 corresponds to "day". Then, the "day" PDAY of the time lapse reference date is incremented on Step #805. If the display format is not "month/day/year" nor "day/month/year", the format "year/month/day" is selected as reference date display format in PA mode. Then, the switch 21 corresponds to the place "year", and the "year" PYEAR is incremented on Step #803. If the normal display mode is detected on Step #800, Step #806, #807, #808 or #809 is used to determine and detect the display mode, and the digit place coresponding to the switch 21 is incremented on Step #811, #812, #813 or #814 respectively, as it is in PA mode.

Next, the modification by the switch 22 will be described below. In FIG. 16D, the display is judged to be in a non-normal mode if it is detected on Step #820 that MBS in STATUS0 is set, as it is in case of modification by the switch 21. If it is detected on Step #821 that the display is in the interval timer time setting mode, the switch 22 corresponds to the place "hour" of the timer time setting display, and the "hour" TRXHOUR is incremented on Step #825. On Steps #823 and #826, or on Steps #823 and #824, the modification of the PA mode reference date digit corresponding to the switch 22 is similar to that for the switch 21.

If the normal display mode is detected on Step #820, the display mode is determined and detected on Step #827, #828, #829 or #830, and the digit corresponding to the switch 22 is incremented on Step #831, #832, #833 or #834 respectively, as it is in case of the switch 21.

Finally, the modification by the switch 23 will be described below, in reference to FIG. 16E. If the interval time time setting mode is determined and detected on Steps #840 and #841, the timer minute digit (TRXMiN) corresponding to the switch 23 is incremented on Step #845, as it is in case of the switch 22. If the display is in a normal mode, the display mode is determined on Step #847, #848, #849 or #850, and the digit corresponding to the switch 23 is incremented on Step #852, #853, #854 or #855 respectively, as it is in case of the witches 21 and 23.

After the monitor processing of the switches 20 to 25 has been completed, as described above, the 32 Hz interrupt process is followed by the watch increment process and the timer countdown process on Steps #201 and subsequent processes (see FIG. 16G).

On Step #201, it is determined whether the iNT port is in an active state or not. If the iNT port is active, the iNT port output time counter iNTCNT is decremented by 1 on Step #202, and it is determined if iNTCNT=0 or not on Step #203. If iNTCNT=0, the subroutine iNTSTP is called on Step #204 to provide iNT port=L. The iNTSTP subroutine will be described by using Steps #751 and subsequent processes in FIG. 16R.

iNT port=H is set on Step #751, and iNT port in an active state is cancelled on Step #752. The iNT port output time is 1/32 Hz×7=218 msec, because the initial value of the iNTCNT is 7.

Figure 16H:
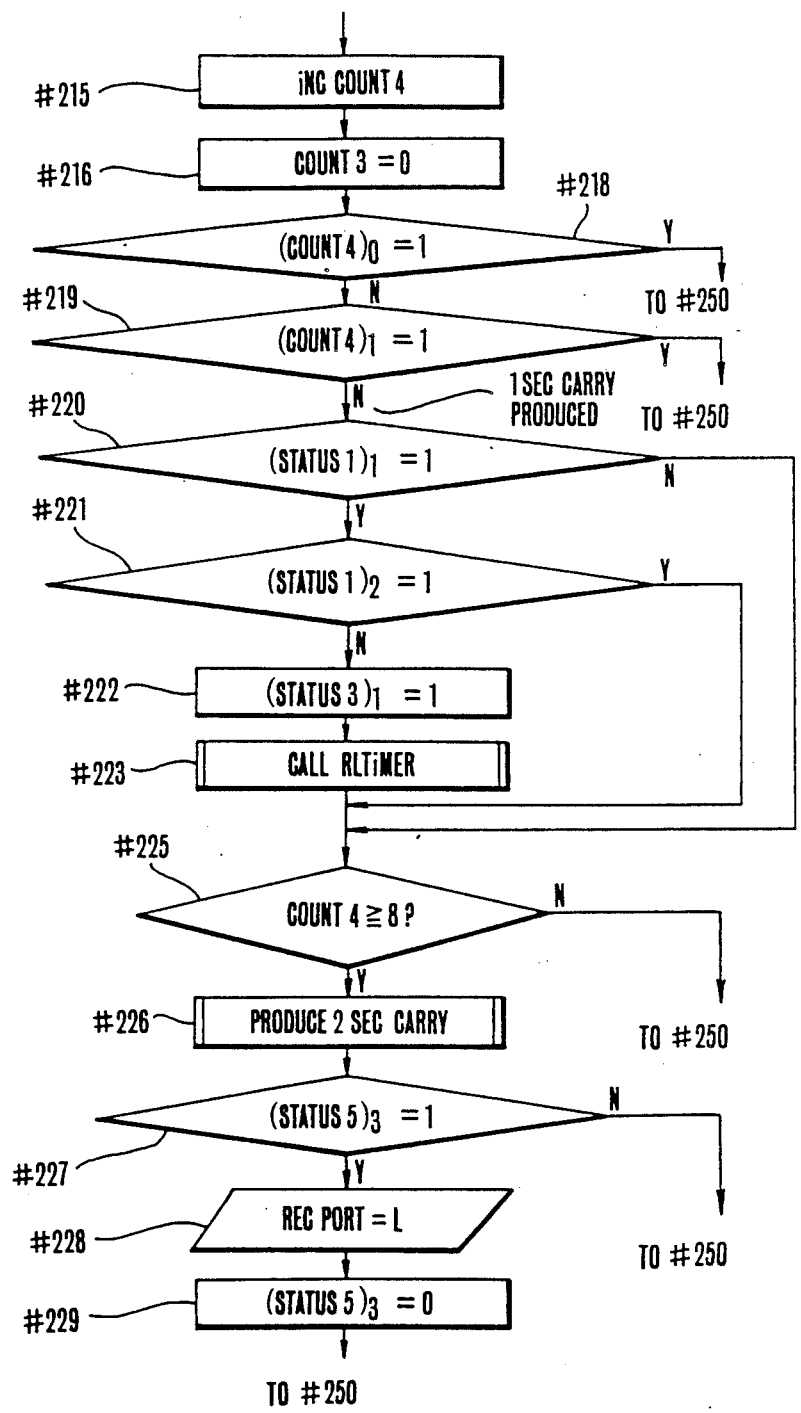

Steps #205 to #210 are for the increment process of the data imprinting watch and calendar. The 32 Hz counter COUNT0 for watch is incremented on Step #205. If COUNT0=8 is detected on Step #206, a 4 Hz carry is outputted to increment the 4 Hz counter COUNT1 by 1 on Step #207 and at the same time, to clear COUNT0 to zero (0) on Step #207A. On Step #208, COUNT1=4 is checked. If it is 4, a carry signal of 1 second is delivered on Step #209, and the watch and calendar are incremented on Step #210. It is determined on Step #211 whether the timer is operating or not. If the timer is operating, REC port=H output state is not checked on Step #212. This means that in addition to the above-described watch counter, 32 Hz and 4 Hz counters used on Steps #213 and #215 are separately provided to count down the timer set time during the interval timer operation and to count the output time of the data imprinting recognition mark (REC port) during the output thereof, so that the control will jump to Steps #250 and subsequent without passing Steps #213 and subsequent for counting, if the interval timer is not operating or if REC port=H output state is not detected. If the interval timer is operating or if REC port=H output state is detected, another 32 Hz counter COUNT3 separately provided from the above-described COUNT1 is incremented by 1 on Step #213, and it is determined on Step #214 whether COUNT3=8 is true or not. If COUNT3=8 is true, a 4 Hz carry signal is produced to increment the 4 Hz counter COUNT4 on Step #215 as shown in FIG. 16H and to clear the 32 Hz counter COUNT3 to zero (0) on Step #216. On Steps #218 and #219, it is then determined whether the contents of the counter COUNT4 is 4 or more. It is 4 or more, the timer produces a carry signal or 1 second. Under these conditions, it is determined on Step #220 whether the interval timer is operating or not. If the interval timer is operating, it is determined on Step #221 whether the interval timer is or is not in the main switch state signal (in serial code on timer startup) input waiting state. If the timer is not in the waiting state, the control proceeds to Step #222 where the display change request flag is set, and to Step #223 where the subroutine RLTiMER is called to process the countdown operation of the interval timer. The subroutine RLTiMER will be described below by referring to FIG. 16J. The subroutine RLTiMER starts the processing on Step #301. Since the timer counter produced a carry signal of 1 second on Step #219, the low-order second digit TRSEC0 on the interval timer is decremented by 1 on Step #301, and the low-order second digit is checked for 0 on Step #302. If it is zero (0), the high-order second digit is decremented by 1 on Step #303. On Step #304, it is detemined whether the zero flag is set or not on the microcomputer as a result of the high-order second digit having been decremented on Step #304. If the zero flag is set, the minute digits, and the hour digits, if the zero flag is set as the calculating result of the minute digits, are sequentially decremented on Step #305. On Steps #306, #307 and #308, it is checked if the minute digits=0, hour digits=0, and high-order second digit=1 and low-order second digit=0 are true or not, that is, if the interval timer is 10 seconds before it counts up. If the timer is 10 seconds before counting up, the subroutine iNTACT is called to make the above-described iNT port active on Step #309. Since the control is arranged as described above, if the self-timer of the camera body is set, for example, in 10 seconds, the time left, 10 sec, is checked at this point, and the self-timer of the camera body starts in counting by setting the iNT port on H level.

On Step #310, STATUS is set in the state that the interval timer time has been counted down to 10 seconds or less. On Step #311, it is in determined whether the imprinting mode is in the normal mode or the PA mode. If it is determined to be in the PA mode, the imprinting display is set to the time lapse display on Step #313. On the other hand, if it is determined to be the normal mode, MSB in STATUS0 is made to be zero on Step #312, so that the imprinting display is set to the normal imprinting display. Accordingly, the interval timer countdown display is switched again to the data imprinting information display. On Step #314, the subroutine MDCLR is called to clear the data display area, since the display mode was changed. The subroutine MDCLR is processed on Steps #395 and #396 as shown in FIG. 16O. The display change request flag is set on Step #395, and blank signals are transmitted to all display digit places on Step #396 to clear the display area. On the other hand, if not TRSeC1=1 on Step #307, all the digits of the timer are judged again on Step #315. If all the digits are zero, the timer is in the state of counting up, so that on Step #316 an operating state of the interval timer is cancelled.

On Step #225, it is checked if the 4 Hz counter COUNT4 is 8 or more. If this counter is 8 or more, a carry of 2 seconds is produced on Step #226. If the data imprinting recognition mark output state (REC port=H) is detected on Step #227, REC port=L is set on Step #228 to turn off the REC mark 37. On Step #229, STATUS5 is reset to data imprinting REC mark output state flag. Then, COUNT0=0 is checked on Step #250 (FIG. 16I). If it is not 0, the display change request flag is checked on Step #251. If this flag is set, the display mode is determined according to the values of STATUS0 and STATUS4 on Step #259, and the display information according to the mode is transmitted to the LCD driver 9. On Step #260, the display change request flag is reset, and on Step #280, the CPU 1 is set in HALT state. If COUNT0=0 is detected on Step #250, a 4 Hz carry signal is produced. On Step #252, it is determined whether the interval timer time has been counted down to to 10 seconds or less. If it has been counted down within 10 seconds, it is checked on Step #253 if the interval timer is counting down or not. If the timer is not operating, the interval timer is in the state of counting up, similar to that on Step #315, so that the low-order second digit TRSEC0 on the timer is incremented by 1 on Step #254. On Step #255, TRESEC0=8 is checked. If it is 8, the high-order second digit of the timer is incremented by 1 on Step #256, and at the same time, TRSEC0 is cleared to 0 on Step #256A. On Step #257, it is determined whether TRESEC1 is 10 or more. If it is 10 or more, it means that 20 seconds or more (4 Hz×80 counts) have passed after the timer counted up. Consequently the subroutine RTCANCM is called on Step #258 to cancel the interval timer. The subroutine RTCANCM will be described hereinafter. After the interval timer was canceled, the mode is checked according to the values of STATUS0 and STATUS4, and the display according to the mode is provided on Step #259. Then, the CPU 1 is set in a HALT state. If the display change request flag is not set on Step #251, the display information is not changed, and the CPU 1 is set in the HALT state.

The processing of the serial codes received from the camera body will be described below by referring to FIG. 16L.

When the CPU 1 receives the serial interrupt signal, the program starts to process Step #501 "SiOiNT". On Step #501, it is determined if the contents of the dSiCNT counter which counts the pulses of serial synchronous clocks is 16. If it is not 16, the serial input data are considered to be invalid on Step #540, and the CPU 1 is set in HALT state. If the clock count is 16 with the data valid, the contents of each serial buffer, which are 16-bit serial data divided into 4 groups of 4 bits each, are loaded in the RAM areas SiO0, SiO1, SiO2 and SiO3 on Step #502, and the SiCNT counter is cleared to 0 on Step #503. On Step #504, the bit 3 (MSB) in SiO2 is checked. If the state of bit 3 is 1, it indicates the data imprinting signal (also, the release signal), and the subroutine LAMPON for lighting the data imprinting lamp 14 is called on Step #550. Now, the processing of this subroutine LAMPON will be described below in reference to FIG. 16M. On Steps #601, #602 and #603, it is checked if the lamp has been lighted (TRi port=H), if the data is being modified by the modifying switches and if the PA mode reference date is being set (the switch 24 is in a pressed state) respectively. If any of these states is detected, the lamp lighting state is disabled to turn off the lamp. Then, on Step #604, it is checked if STATUS is in the state that the interval timer has been counted down within 10 seconds. If STATUS is in the state, it is determined on Step #630 whether the data display mode is OFF mode. If it is OFF mode, the subroutine PHOTOEND is called on Step #631 to prepare for starting the next counting process of the interval timer. If the display mode is not in a OFF mode, the control proceeds to Steps #608 and subsequent for the lamp lighting process.

Here, the subroutine PHOTOEND will be described in reference to FIG. 16N. In PHOTOEND, the low-order and high-order second digits on the interval timer counter are cleared to zero (0) on Step #661. On jStep #662, the low-order minute digit to high-order hour digit of the interval timer set time stored on the startup are copied in the memory area which counts down in practice. On Step #663, the subroutine EXTDSP is called to process the other displays than the data imprinting information display.

The subroutine EXTDSP starts on Step #350 as shown in FIG. 16P. On Step 351 STATUS is set in the displaying state in any mode other than in the normal mode. On Step #352, the display change request flag is set, since the display mode is changed. On Step #353, blank signals are transmitted to the digit places of the display area to clear the displayed digits.

After EXTDSP has been processed, the STATUS6 which is in the state that the interval timer has been counted down within 10 seconds is reset on Step #665. On Step #666, the flag of interval timer countdown operation is set. On Step #667, it is checked if the data imprinting mode is in the PA mode or time lapse display mode. If it is in the time lapse mode, the control proceeds to Step #668 where STATUS is set to the interval timer mode and the PA mode and where the flag for countdown display during the timer operation is set. If it is detected on Step #667 that the data imprinting mode is not in the PA mode, only the flag for timer countdown display is set on Step #669. Thus, the PHOTOEND process is completed and the control returns to the the subroutine LAMPON. If the data imprinting mode is in the OFF mode, the CPU 1 is set in the HALT state after having returned from the subroutine LAMPON.

If it is not detected on Step #604 in the subroutine LAMPON that the interval timer has counted down within 10 seconds, it is checked on Steps #605 and #606 if STATUS is in the interval timer counting state and in the interval timer time setting state, respectively. If STATUS is in any of the two states, the interval timer mode cancel process is performed on Steps #620 and subsequent. This process will be described hereinafter. If STATUS is not detected on Steps #605 and #606 to be in any of said two states, it is determined on Step #607 whether the data imprinting mode is in an OFF mode or not. If OFF mode is detected, the CPU 1 exits the data imprinting lamp lighting process and enters the HALT state. If an OFF mode is not detected on step #607, the control proceeds to Step #608 where the TRi timer time is set according to the values of the 3 low-order bits in SiO2 and where the timer counting is started. Then, TRi port=H is set on Step #609 to start the lighting of the lamp 14. On Step #610, STATUS is set to TRi port=H output state. The REC mark 37 is lighted on Step #611, and REC port=H output state is set on Step #612. Thus, the lamp lighting process is completed. Then, the control returns to SiOiNT and the CPU 1 is set in the HALT state.

If it is detected on steps #605 and #606 that the interval timer is in the operating state or in the time setting state, respectively, it is checked on Step #620 if STATUS is in the interval timer mode and in the PA data imprinting mode. Thus, the interval timer cancel means is divided into two. At first, if the interval timer is in the PA mode, that is, if MSB of STATUS4 is 1, the subroutine RTCANCM is called on Step #621. In the subroutine RTCANCM as shown in FIG. 16O, the flag of interval timer operating state is reset on Step #391, and the flag of interval timer time setting state is reset on Step #392. Then, the flag of interval timer having counted down within 10 seconds is reset on Step #393. The control returns to Step #622.

On Step #622, the display after the interval timer was cancelled and changed into the PA mode timer lapse display. Since the display is changed, the display change request flag is set on Step #623. On Step #624, the above-descried subroutine MDCLR is called to clear the display area, and the CPU 1 exits the subroutine LAMPON. If it is detected on Step #620 that MSB of STATUS4 is 0, that is, that the data imprinting mode is not in the PA mode, the subroutine RTCANCL is called on Step #640 to cancel the interval timer mode. In the subroutine RTCANCL as shown in FIG. 16O, STATUS is returned to the data imprinting information display in a normal mode by resetting MSB of STATUS0 on Step #381. At this point, if the interval timer mode or PA the mode were recovered to set MSB in STATUS0, the values in the 3 lower-order bits would not be changed. If the interval timer mode or the PA mode were cancelled to reset MSB of STATUS0, therefore, the state (display) in the interval timer mode or the PA mode, which had been provided before the interval timer mode or the PA mode was set, could be recovered by checking the values in the 3 lower-order bits. The subroutine RTCANCL is thus designed. The subroutine RTCANCL then jumps to the subroutine RTCANCM where each STATUS flag in the interval timer mode is reset, as described above. The CPU 1 exits the subroutine LAMPON and enters into the HALT state.

Here, the SiOiNT interrupt process will be described below in reference to FIG. 16L. If the lamp lighting signal is not detected on Step #504, the PIM port is set to "H" or "L" on Step #506 or #507, respectively, according to the state of bit 2 in SiO2 detected on Step #505. On Step #508, the state of bit 1 in SiO2 is detected, and the process depends upon the state of the main switch 53 on the camera body. If the main switch 53 is set to ON, it is determined on Steps #509 and #510 whether STATUS is or is not in the interval timer operating state and in a waiting state to receive a main switch state signal (in serial code) from the camera body. If STATUS is in the waiting state, the low-order and high-order second digits on the timer counter are cleared to zero (0) on Step #511, the waiting state of STATUS is reset on Step #512, and the interval timer is set into interval timer operating state so that the interval timer can start counting down from the next 32 Hz interrupt. To inform the camera body of the waiting state end, the subroutine iNTSTP is called on Step #514 to set iNT port=L. Then, the CPU 1 enters into the HALT state.

In the subroutine iNTSTP, as shown in FIG. 16R, the I/O port 17 delivers iNT port=L on Step #751, and the iNT port active flag is reset on Step #752.

If it is detected on Step #508 that the main switch 53 is OFF, it is checked on Step #515 if the interval timer is operating. If it is operating, the interval timer cancel process is divided into two courses according to the data imprinting mode which is the PA mode or not; Steps #516, #517, #518, #519 and #520 and Steps #516 and #530, as Steps #620, #621, #622, #623 and #624 and Steps #620 and #640 in the above-described subroutine LAMPON as shown in FIG. 16M. After the interval timer cancel process has been completed, the CPU 1 enters into the HALT state.

Next, the timer interrupt process (RTiNT) required on the TRi timer counting up will be described in reference to FIG. 16Q.

If the timer interrupt occurs, the CPU 1 starts the operation from Step #701. On Step #701, TRi port=L is set to turn off the lamp. On Step #702, STATUS of TRi port=H output state is cleared. It is then determined on Step #703 whether the interval timer time has been counted down within 10 seconds or not. If the time left is not within 10 seconds, the RTiNT process is completed to set the CPU 1 in HALT state. If it is detected on Step #703 that the interval timer time has been counted down within 10 seconds, the subroutine PHOTOEND is called on Step #704 to prepare for the next counting cycle of the interval timer. The subroutine PHOTOEND is as described in the SiOiNT process. On Step #705, the subroutine EXTDSP is called to process the displays other than the data imprinting information display in the normal mode. The subroutine EXTDSP is as described above. Then, the sequence is set in the HALT state.

How to monitor the state of the main switch 53 on the camera body on the startup of the interval timer will be described below.

Figure 17:
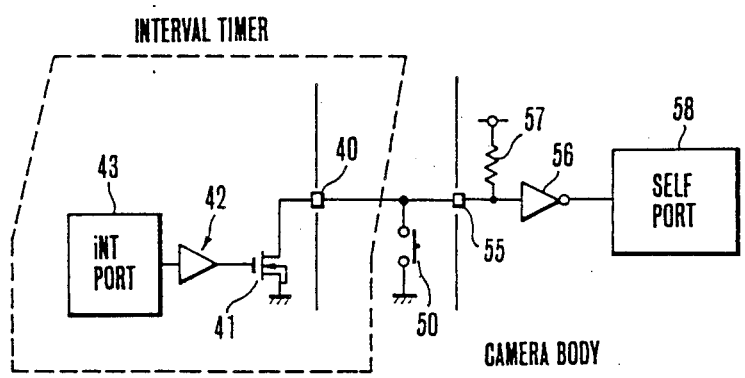
FIG. 17 is a circuit diagram showing the interconnection between the interval timer and the camera body.
Figure 18:
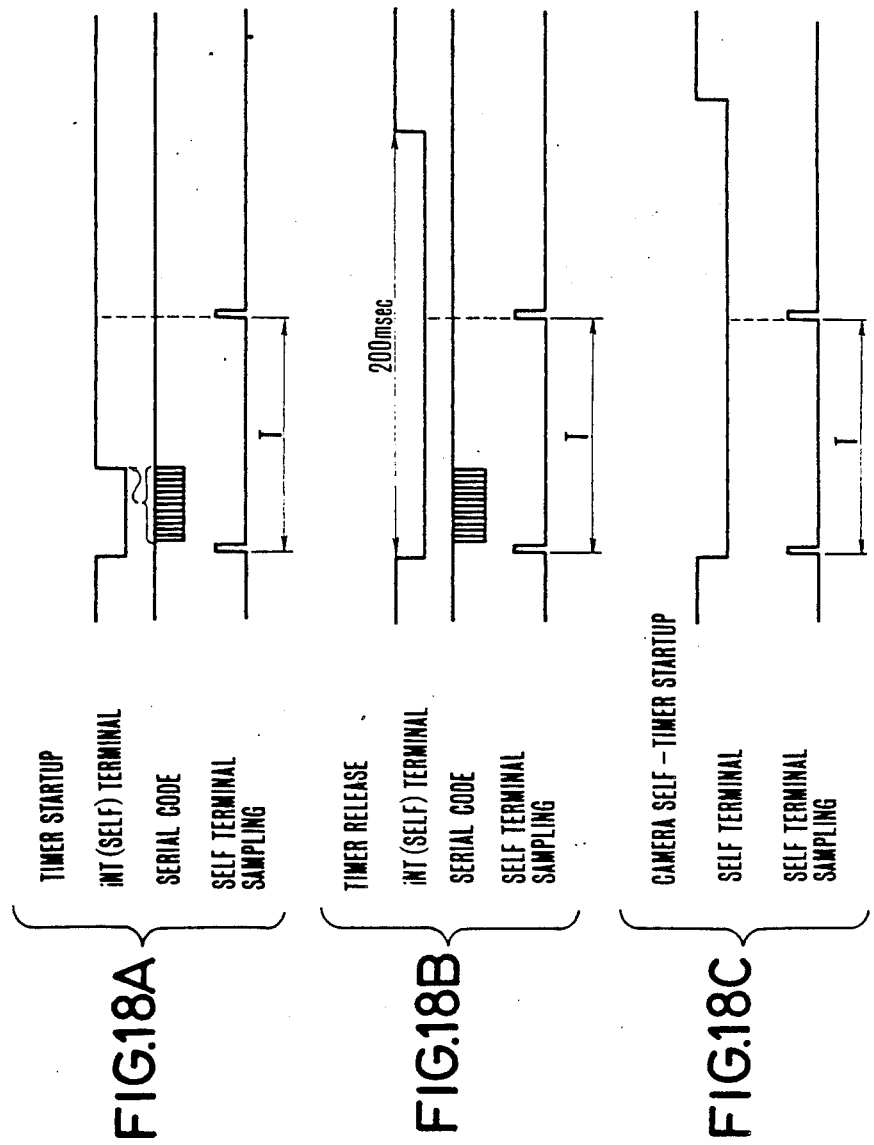
FIGS. 18A to 18C are timing charts showing the timer operation.

During the interval timer operation, the camera is released when the self-timer is started up. Therefore, the camera control circuit is required to identify (i) the timer startup signal, (ii) the timer release signal and (iii) the self-timer startup by a self-switch. FIG. 17 shows the circuit configuration of the connection between the iNT port terminal of the interval timer and the SELF terminal of the camera control circuit in this embodiment according to the present invention. In this figure, the configuration of the interval timer control circuit is shown in the box defined by a broken line on the left side, while the configuration of the camera control circuit is shown on the right side.

In this figure, 40 is an iNT terminal in the interval timer control circuit 43, which is described hereinafter. 41 is an N-channel MOS transistor, which is the same as shown by 18 in FIG. 3. 42 is an iNT signal output buffer, 43 is an interval timer control circuit which contains the above-described microcomputer, 50 is a self-timer switch on the camera, 55 is a SELF terminal in a camera control circuit, 56 is a SELF signal input inverter, 57 is a resistor which pulls up the input to the inverter 56, and 58 is a camera control circuit.

Now, the signal timings will be described by referring to the timing charts, FIGS. 18A to 18C. If the self-timer is started up by means of the self-timer switch 50, the input to the inverter 56, which has been pulled up by the pull-up resistor 57, is set to L level when the self-timer switch 50 is turned on, as shown in the timing chart, FIG. 18C. The camera control circuit 58 is designed so that it can sample the SELF terminal 55 at the predetermined period of time (T), for example, that the self-timer is started up when 2 or more L levels are detected. The camera control circuit 58 is also designed so that it can transfer the serial code containing the main switch state signal to the interval timer through the above-described serial interface circuit 19 when it samples and detects the first L level of the SELF terminal. Therefore, the self-timer on the camera can be started up by pressing the self-timer switch 50 for a longer time than the sampling period (T).

As it is shown in the timing chart, FIG. 18A, when the interval timer is started up, the interval timer control circuit 43 sets the MOS transistor 41 to ON to set the SELF terminal 55 to L level, and the camera control circuit 58 then detects L level of the SELF terminal 55 for the first timer by sampling and delivers the main switch state signal in serial code. The interval timer control circuit 43 receives this state signal and sets the iNT port to L level at the same time. If this setting of the iNT port to L (SELF terminal=H) occurs before the second sampling of the SELF terminal, the self-timer on the camera body will not start up. Since the interval time control circuit 43 side has received the state signal of the main switch 53 in serial code, it can determine whether the interval timer is to be started or not, by checking the serial code. The checking process is as described in the explanation on SiOiNT as shown in FIG. 16L.

Finally, if the interval timer counts up to start the self-timer, the interval timer control circuit 43 does not set the iNT port to H according to the serial code input, but keeps it on "L" level for the predetermined time (200 msec in this embodiment), unlike the above-described starting, as shown in the timing chart FIG. 18B, and can start up the self-timer when the 2 "L" levels of the SELF terminal are detected. It is understood that the sampling period (T) for the SELF terminal in the camera control circuit 58 is sufficiently shorter than 200 msec.

In this embodiment, the interval timer mode is cancelled if the main switch 53 on the camera body is OFF. However, the timer time may be reset in the interval timer mode.

Alternatively, this embodiment may be designed so that a warning display can be provided if the main switch 53 on the camera body is OFF when the interval timer is started, or if the main switch 53 on the camera body is set to OFF during the operation of the interval timer.

Another embodiment of the present invention will be described below.

Figure 19:
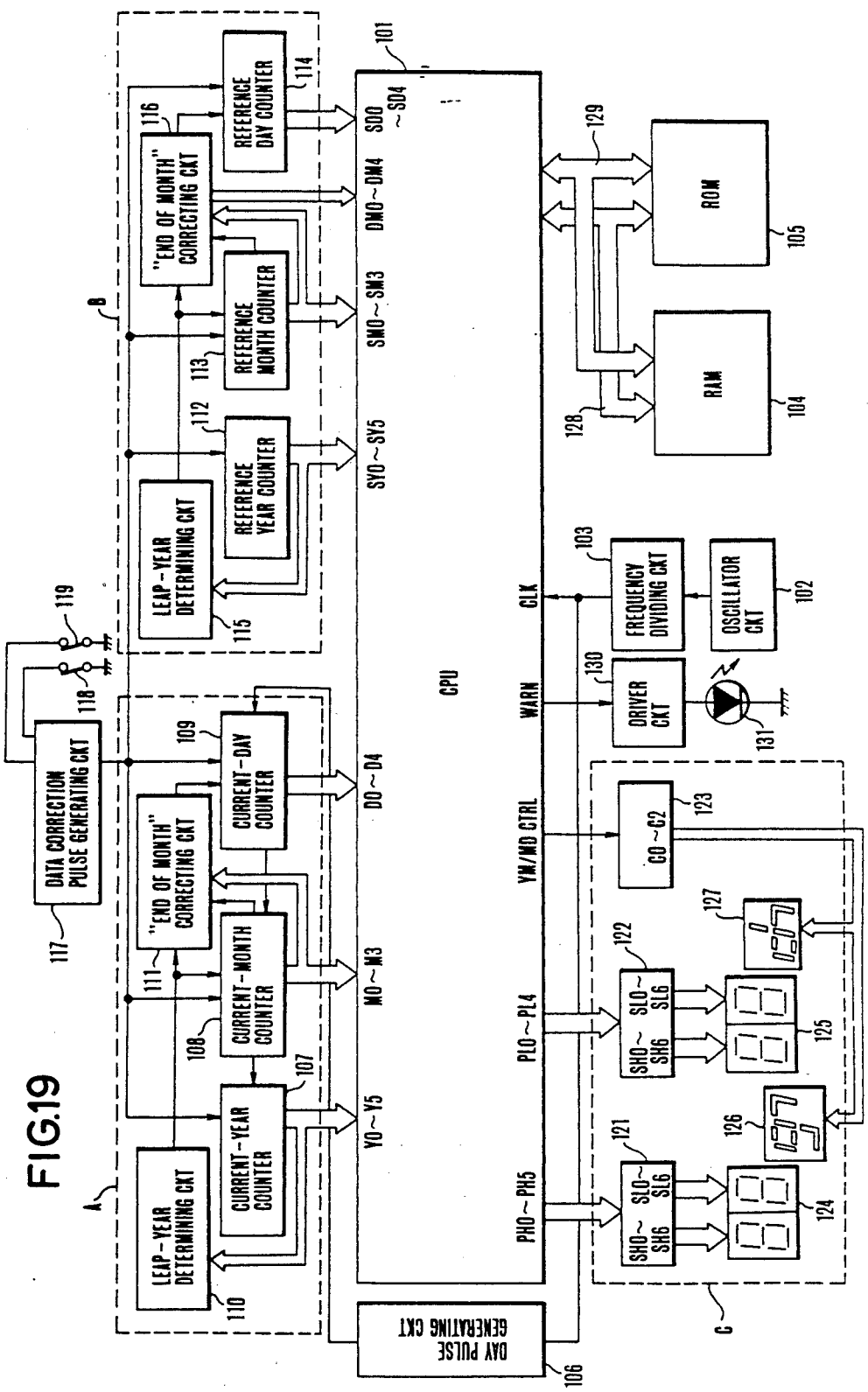
FIG. 19 is a block diagram showing the circuit configuration of a time lapse calculator illustrating another embodiment of the present invention.

FIG. 19 is a block diagram showing the circuit configuration of another embodiment unit according to the present invention, comprising a data imprinting capability mounted on the camera, as in the above-described embodiment.

In FIG. 19, 101 is a central processing unit (hereinafter referred to as CPU) which calculates any lapsed time and controls the operating sequence of the circuits as described hereinafter. 102 is an oscillator circuit. 103 is a frequency dividing circuit which divides the output from the oscillator circuit 102 and delivers clock pulses at the predetermined period to the CLK terminal of the CPU 101. 104 is a memory RAM and 105 is a memory ROM. 106 is a day pulse generating circuit which divides the clock pulse output signals from the frequency dividing circuit 103 to produce a day pulse which represents a day.

The memory 104 inputs and outputs data. The memory 105 stores the contents of a program.

In the upper part of FIG. 19, a block A defined by a broken line represents a current-date counter which counts the current date and contains a current-year counter circuit 107, a current-month counter circuit 108, a current-day counter circuit 109, a leap-year determining circuit 110 and an "end of month" correcting circuit 111.

The current-year counter 107 delivers an output corresponding to the 2 lowest-order digits of the current year in the Gregorian calendar to the input ports Y0 to Y5 in the CPU 101.

The current-month counter 108 delivers an output corresponding to the number of the current month (which is represented by any of the numbers 1 to 12 corresponding to January to December, respectively) to the input ports M0 to M3 in the CPU 101.

The current-day counter 109 delivers an output corresponding to the current day to the input ports D0 to D4 in the CPU 101.

The leap-year determining circuit 110 is a known circuit which determines whether the output from the current-year counter 107 corresponds to a leap-year or not.

The "end of month" correcting circuit 111 determines whether the output from the current-month counter 108 corresponds to the current month of 31 days or 30 days and whether the output from the current-year counter 110 corresponds to the leap-year or not if the current month is determined as February (containing 29 days in a leap-year or 28 days in any other year), and delivers an "end of month" correcting signal to the current-day counter 109.

In the upper and right part of FIG. 19, a block B represents a reference date setting counter which sets the reference date for the calculation of a lapsed time. This counter contains a reference year counter 112, a reference month counter 113, a reference day counter 114, a leap-year determining circuit 115 and an "end of month" correcting circuit 116.

The reference year counter 112 counts years in the Gregorian calendar, the reference month counter 113 counts months, and the reference day counter 114 counts days. The reference year counter 112 delivers the output to the input ports SY0 to SY5 in the CPU 101. The reference month counter 113 delivers the output to the input ports SM0 to SM3 in the CPU 101. The reference day counter 114 delivers the output to the input ports SD0 to SD4 in the CPU 101. The "end of month" correcting circuit 116 delivers the output to the input ports DM0 to DM4 in the CPU 101.

The "end of month" correcting circuit 116 produces an "end of month" correction signal which commands the CPU 101 to correct the day count from the reference day counter 114 as well as the 5-bit information of the days in the reference month, and delivers the signal and the 5-bit information to the input ports DM0 to DM4 in the CPU 101.

The current-year counter 107, the current-month counter 108, the current-day counter 109, the reference year counter 112, the reference month counter 113 and the reference day counter 114 are arranged to be controlled by the data correction pulse signal produced by a data correction pulse generating circuit 117. This circuit 117 selects one of the above 6 counters when a switch 118 connected to the circuit 117 is closed, and applies a correction increment pulse to the selected counter when a switch 119 connected to the circuit 117 is closed.

In the lower and left part of FIG. 19, a block C represents a display means which displays a lapse of time from any reference time to the current time in addition to the other data. The display means contains decoders 121 to 123 and display sections 124 to 127. The decoder 121 decodes the high-order two digits of the time lapse data produced by the output ports PH0 to PH5 in the CPU 101, and delivers its output to a driving element to drive 2 display elements of 7 segments each in the high-order digit display section 124. The decoder 122 decodes the low-order two digits of the time lapse data produced by the output ports PL0 to PL4 in the CPU 101, and delivers its output to a driving element to drive 2 display elements of 7 segments each in the low-order digit display section 125. Therefore, the decoders 121 and 122 have 7 output ports SH0 to SH6 and SL0 to SL6, respectively, for each display element in the display sections 124 and 125, respectively.

The decoder 123 produces the driving outputs corresponding to the units (year, month and day) for any lapsed period of time, and delivers them to the unit display sections 126 and 127. This decoder 123 decodes the output signal produced by the output port YM/MD CTRL in the CPU 101, and delivers through 2 output ports C0 to C2 the output to a driving element to drive the display element of segments corresponding to the high-order data (y or m, that is, year or month, respectively) as well as the output to a driving element to drive the display element of segments corresponding to the low-order data (m or d, that is, month or day).

130 is a driver circuit which drives an LED 131 which displays a warning according to the output from an output port WARN in the CPU 101, if the reference date is set on or after the current date.

FIG. 20 is a table listing the port addresses and their contents in every input or output port in the CPU 101 in reference with every memory address.

FIG. 21 is a table listing the outputs (DM outputs) of the "end of month" correcting circuit according to the reference year and the reference month.

FIG. 22 is a flow chart showing a program run in the CPU 101.

Figure 23:
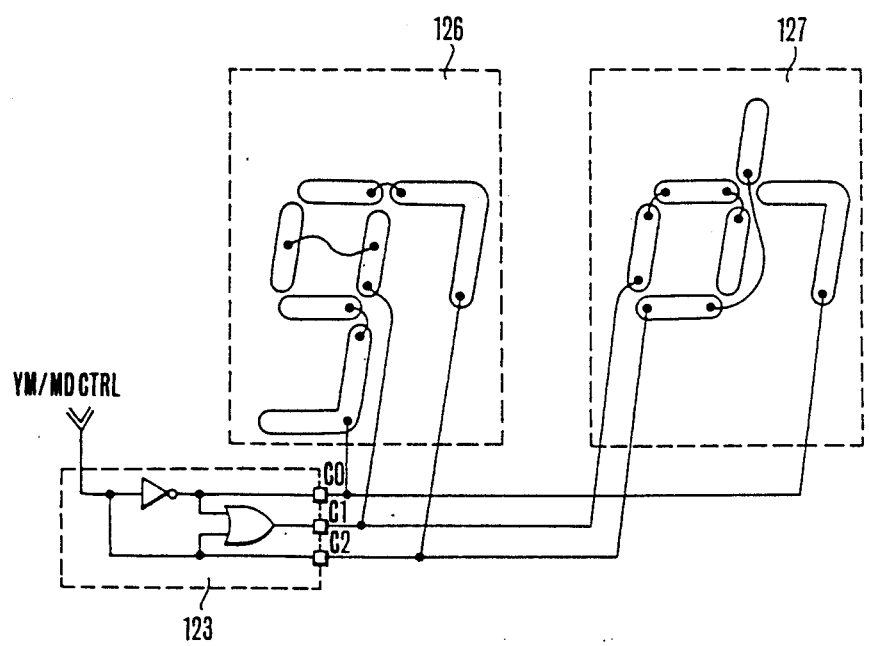
FIG. 23 is a schematic view showing the configuration of a decoder 123 and unit display sections 126 and 127 contained in a block C as shown in FIG. 19.

FIG. 23 is a schematical view showing the configuration of the decoder 123, the layout of segments in the unit display sections 126 and 127, and the electrical connections of the segments with the decoder 123.

The contents of the current-year counter 107, the current-month counter 108 and the current-day counter 109 as well as the contents of the reference year counter 122, the reference month counter 113 and the reference day counter 114 are stored in the memory 104 through the corresponding input ports in the CPU 101, while the contents of the memory 104 are entered in the decoders 121 and 122 through the output ports PH0 to PH5 and PL0 to PL5, respectively.

The operation of the unit which is an embodiment of the present invention will be described below by referring to FIGS. 19 to 23.

When a power switch (not shown) is turned on, the CPU 101 is operated to run a program as shown in the flowchart in FIG. 22.

In FIG. 22, the CPU 101 starts to run the program from Step #01. Particularly, the CPU 101 calculates the number of passed days (PD) by subtracting the reference day (SD) from the current day stored in the memory 104 or the output from the current-day counter 109. On Step #02, the value (PD) is checked for positive or negative. If the value (PD) is positive, the number of passed months (PM) is determined on Step #06 by subtracting the output (SM) of the reference month counter 113 from the output (M) of the current-month counter 108. Then, the control proceeds to Step #07.

If the value (PD) is determined as negative on Step #02, the control proceeds to Step #03 where the number of days (DM) in the reference month ("29" as the number of days if the reference day is in a leap-year) is added to the calculated number of passed days (PD). Then, on Step #04, the number of passed months (PM) is calculated by subtracting the reference month (SM) from the current month (M). On Step #05, the number of passed month (PM) is reduced by 1 to offset the number of days (DM) in the reference month added to the number of passed days (PD). The, the control proceeds to Step #07.

On Step #07, the number of passed months (PM) is checked for positive or negative. If the value (PM) is positive, the control proceeds to Step #11 where the number of passed years (PY) is calculated by subtracting the reference year (SY) from the current year (Y), and to Step #12.

If the number of passed months (PM) is determined as negative on Step #07, the control proceeds to Step #08 where the number of passed months (PM) is incremented by 12, and to Step #09. On Step #09, as on Step #11, the number of passed years (PY) is calculated by subtracting the reference year (SY) from the current year (Y). On Step #10, as on Step #05, the number of passed years (PY) is reduced by 1. Then, the control proceeds to Step #12.

On Step #12, it is determined whether the number of passed years (PY) calculated on Step #10 or Step #11 is negative or not. If it is not negative, it means that the setting of the reference date is correct. On Step #13, the output of the output port WARN is kept on L level. On Step #14, it is checked if (PY)=0 or not. If (PY)=0, the control proceeds to Step #17. If (PY)≠0, the control proceeds to Step #15. On Step #17, the number of passed months (PM) is outputted as the high-order digits (PH) of the time lapse display, while the number of passed days (PD) is outputted as the low-order digits (PL) of the time lapse display. On Step #19, the output of the YM/MD CTRL port in the CPU 101 is set to a "H" (high level). As a result, as shown in FIG. 23, the output terminal C0 of the decoder 123 is set to "L" (Low level), and the two other output terminals C1 and C2 are set to "H" (high level). Consequently, the segments in the unit display section 126 are excited in the form of "m" (month), while the segments in the unit display section 127 are excited in the form of "d" (day). Thus, the lapsed period of time "x months and x days" is displayed in the format of "x m" - "x d".

If the number of passed years is determined as (PY)≠0 on Step #14, the instruction is given on Step #15 that the number of passed years (PY) and the number of passed months (PM) shall be displayed as the high-order digits (PH) and low-order digits (PL) of the time lapse display, respectively. On Step #18, the output level of the YM/MD CTRL port in the CPU 101 is set to "L" (low level). As the results, as shown in FIG. 23, the terminals C0 and C1 of the three output terminals on the decorder 123 are set to "H" (high level) in output level. Consequently, the segments in the unit display section 126 are lighted in the form of "y" (year), while the segments in the unit display section 127 are lighted in the form of "m" (month). Thus, the lapsed period of time "x years and x months" is displayed in the format of "x y" - "x m".

If it is determined on Step #12 that the number of passed years (PY) is negative, it means that the reference date is erroneously set as any date equal to or later than the current date. Then, the control proceeds directly to Step #16 where the output of the output port WARN is set to "H" (high level) to light the LED 131 through the driver circuit 130 in order to inform the user of the camera of the erroneous setting.

Carry-in and carry-out circuits are connected between the current-date counters 107 to 109. In addition, a day pulse produced by the day pulse generating circuit 106 is delivered to the current-day counter 109 every day. Therefore, the current-year counter 107, the current-month counter 108 and the current-day counter 109 are operated as a normal calendar to increment (advance) the current date as the time elapses and consequently to increment (vary) the time lapse display as well.

FIG. 24 is a flowchart showing a partial modification of the flowchart as shown in FIG. 22, that is, a modification of the embodiment as shown in FIG. 19. In the flowchart in FIG. 22, the LED 131 is lighted to warn that the reference date is erroneously set as any date on or after the current date. In the embodiment as shown in FIG. 24, however, the display "0m 0d" is provided essentially as the warning, if the status "0 month and 0 day" occurs as shown on Step #16' in FIG. 24. This procedure is run on Steps #12, #16', #17 and #19 in this order.

The remaining part of the flowchart in FIG. 24 is similar to that shown in the flowchart in FIG. 22. Therefore, the same step numbers are used for the same steps, and the description of the steps in this part of the flow chart as shown in FIG. 24 are omitted.

In this embodiment, it is understood that the lapsed period of time thus displayed can be imprinted on a film as sensitive means, as in the previous embodiment.

What is claimed is:

1. A data imprinting device for a camera comprising:
   (A) calculating means for calculating automatically the lapse of time from any specified time to the current time; and
   (B) imprinting means for imprinting said lapse of time calculated by said calculating means on a sensitive means; and
   (C) selection means for causing said imprinting means to select either of said current time or said lapse of time.

2. A device according to claim 1, further comprising determining means for determining whether said lapse of time is shorter than one year or not shorter than one year, wherein said determining means permits said imprinting means to imprint said lapse of time in the display format of months and days if said lapse of time is shorter than one year, or in the display format of years and months if said lapse of time is not shorter than one year.

3. A device according to claim 2, further comprising display means for displaying said lapse of time, wherein said display means displays the number of years for said lapse of time not shorter than one year in the months display section for said lapse of time shorter than one year, and the number of months for said lapse of time not shorter than one year in the days display section for said lapse of time shorter than one year.

4. A device according to claim 1, wherein said calculating means includes means for subtracting one past month from said calculated lapse of time and adding to said calculated lapse of time the number of remaining days after the date of said specified time in the month containing said specified time if said calculated lapse of days is negative in the process of calculating said lapse of time.

5. A device according to claim 4, wherein said calculating means includes means for varying the number of days to be added to said lapse of time in response to whether the month containing said specified time is in a leap-year or not.

6. A device according to claim 1, wherein said calculating means includes means for updating said lapse of time as the current time passes.

7. A device according to claim 1, wherein said calculating means includes means for subtracting said specified time from the current time.

8. A camera according to claim 1, further comprising warning means for giving a warning if said lapse of time calculated by said calculating means is determined as negative.

9. A camera according to claim 8, wherein said warning means includes means for setting said lapse of time to zero.

10. A device according to claim 1, further comprising:
(C) display means for displaying said lapse of time; and
(D) switching means for permitting said displaying means to display said specified time in the first state of said switching means as well as said lapse of time in the second state of said switching means.

11. A device according to claim 10, wherein said first and second states of said switching means include the ON and OFF states.

12. A device according to claim 1, further comprising display means for displaying said lapse of time, wherein said display means comprises displaying sections, each of which is composed of plural digits formed by 7 segments arranged in the form of a Chinese letter "日" and an auxiliary segment which has a linear part that looks like the extension of at least one of said 7 segments and a folded part that extends from said linear part in the substantially perpendicular direction to said linear part.

13. A device according to claim 12, wherein said auxiliary segment is designed in such a form that extends to the right from the central segment of said 7 segments forming a digit in the form of said letter "日" and is folded downward on the way so as to be able to display the lower-case letter "m".

14. A device according to claim 12, wherein said auxiliary segment is designed in such a form that extends downward from the right-side segment of said 7 segments forming a digit in the form of said letter "日" and is folded to the left on the way so as to be able to display the lower-case letter "y".

15. A camera comprising:
(A) calculating means for calculating automatically the lapse of time from any specified time to the current time;
(B) display means for displaying said lapse of time calculated by said calculating means; and
(C) switching means for permitting said display means to display said specified time in the first state of said switching means as well as lapse of time in the second state of said switching means.

16. A camera according to claim 15, further comprising determining means for determining whether said lapse of time is shorter than one year or not shorter than one year, wherein said determining means permits said display means to display said lapse of time in the display format of months and days if said lapse of time is shorter than one year, or in the display format of years and months if said lapse of time is not shorter than one year.

17. A camera according to claim 16, wherein said display means is arranged to display the number of years for said lapse of time not shorter than one year in the months display section for said lapse of time shorter than one year, and the number of months for said lapse of time not shorter than one year in the days display section for said lapse of time shorter than one year.

18. A camera according to claim 15, wherein said calculating means includes means for subtracting one past month from said calculated lapse of time and adding to said calculated lapse of time the number of remaining days after the date of said specified time in the month containing said specified days if said calculated lapse of time is negative in the process of calculating said lapse of time.

19. A camera according to claim 18, wherein said calculating means includes means for varying the number of days to be added to said lapse of time in response to whether the month containing said specified time is in a leap-year or not.

20. A camera according to claim 15, wherein said calculating means includes means for updating said lapse of time as the current time passes.

21. A camera according to claim 15, wherein said calculating means includes means for subtracting said specified time from the current time.

22. A camera according to claim 15, further comprising warning means for giving a warning if said lapse of time calculated by said calculating means is determined as negative.

23. A camera according to claim 22, wherein said warning means includes means for setting said lapse of time to zero.

24. A camera according to claim 15, wherein said first and second states of said switching means include the ON and OFF states.

25. A camera according to claim 15, wherein said display means comprises displaying sections, each of which is composed of plural digits formed by 7 segments arranged in the form of a Chinese letter "日" and an auxiliary segment which has a linear part that looks like the extension of at least one of said 7 segments and a folded part that extends from said linear part in the substantially perpendicular direction to said linear part.

26. A camera according to claim 25, wherein said auxiliary segment is designed in such a form that extends to the right from the central segment of said 7 segments forming a digit in the form of said letter "日" and is folded downward on the way so as to be able to display the lower-case letter "m".

27. A camera according to claim 25, wherein said auxiliary segment is designed in such a form that extends downward from the right-sided segment of said 7 segments forming a digit in the form of said letter "日" and is folded to the left on the way so as to be able to display the lower-case letter "y".

28. A data recording device for a camera, comprising:
(a) setting means for optionally setting a standard time irrespectively of a real time at which said standard time is set,
(b) computing means for automatically computing a lapse of time from said standard time to a current time, and (c) time lapse recording means for recording on an image recording medium said lapse of time computed by said computing means.

29. A data recording device according to claim 28, wherein said setting means comprises means for setting a day as said standard time.

30. A data recording device according to claim 28, wherein said setting means comprises means for setting a month as said standard time.

31. A data recording device according to claim 28, wherein said setting means comprises means for setting a year as said standard time.

32. A data recording device according to claim 28, further comprising current time output means for outputting a current time, wherein said computing means comprises means for computing said lapse of time on the basis of said standard time set by said setting means and said current time output by said current time output means.

33. A data recording device according to claim 28, wherein said image recording medium is photosensitive means.

34. A data recording device according to claim 33, wherein said photosensitive means is a photographic film.

35. A data recording device according to claim 28, wherein said time lapse recording means comprises optical recording means.

36. A data recording device according to claim 28, wherein said time lapse recording means comprises printing means.

37. A data recording device according to claim 28, wherein said time lapse recording means comprises means for recording a current time.

38. A data recording device according to claim 37, further comprising selection means for causing said time lapse recording means to selectively record either said lapse of time or said current time.

39. A data recording device according to claim 37, further comprising means for designating said lapse of time to be recorded by said time lapse recording means.

40. A data recording device according to claim 39, further comprising means for designating said current time to be recorded by said time lapse recording means.

41. A data recording device according to claim 37, further comprising means for designating said current time to be recorded by said time lapse recording means.

42. A data recording device according to claim 28, further comprising determining means for determining whether said lapse of time is shorter than one year or not shorter than one year, wherein said determining means permits said time lapse recording means to record said lapse of time in the format of months and days if said lapse of time is shorter than one year, or in the format of years and months if said lapse of time is not shorter than one year.

43. A data recording device according to claim 28, wherein said computing means comprises means for subtracting one past month from said computed lapse of time and adding to said computed lapse of time the number of remaining days after the date of said standard time in the month containing said standard time if a computed lapse of days is negative in the process of computing said lapse of time.

44. A data recording device according to claim 43, wherein said computing means comprises means for changing a number of days to be added to said lapse of time in response to whether the number of the days of the month containing said standard time changes depending on whether the year is a leap year or not.

45. A data recording device according to claim 28, wherein said computing means comprises means for renewing said lapse of time together with said current time.

46. A data recording device according to claim 28, wherein said computing means comprises means for subtracting said standard time from said current time.

47. A data recording device according to claim 28, further comprising warning means for giving a warning if said lapse of time computed by said computing means is determined to be a negative number.

48. A data recording device according to claim 47, wherein said warning means comprises means for setting said lapse of time to zero.

49. A data recording device according to claim 28, further comprising display means, having years, months, and days display sections, for displaying said lapse of time, wherein said display means displays the number of years for said lapse of time not shorter than one year in said months display section for said lapse of time shorter than one year, and the number of months for said lapse of time not shorter than one year in said days display section for said lapse of time shorter than one year.

50. A data recording device according to claim 28, further comprising:
(d) display means for displaying said lapse of time; and
(e) switching means for permitting said display means to display said standard time if said switching means is in a first state as well as said lapse of time if said switching means is in a second state.

51. A data recording device according to claim 50, wherein said first and second states of said switching means correspond to ON and OFF states.

52. A data recording device according to claim 28, further comprising display means for displaying said lapse of time, wherein said display means comprises a displaying section which comprises plural signals formed by seven segments arranged in the form of a Chinese letter "日" and an auxiliary segment which has a linear part that forms an extension of at least one of said seven segments and a folded part that extends from said linear part in the substantially perpendicular direction to said linear part.

53. A data recording device according to claim 52, wherein said auxiliary segment is designed in a form such that it extends to the right from the central segment of said seven segments forming a digit in the form of the Chinese letter "日" and is folded downward so as to be able to display the lower-case letter "m".

54. A data recording device according to claim 52, wherein said auxiliary segment is designed in a form such that it extends downward from the right-sided segment of said seven segments forming a digit in the form of the Chinese letter "日" and is folded to the left so as to be able to display the lower-case letter "y".

55. A data display device for a camera comprising:
(a) setting means for setting a standard time optionally irrespectively of a real time at which said standard time is set,
(b) computing means for automatically computing a lapse of time from said standard time to a current time, and
(c) display means for displaying said time lapse computed by said computing means.

56. A data display device according to claim 55, wherein said setting means comprises means for setting a day as said standard time.

57. A data display device according to claim 55, wherein said setting means comprises means for setting a month as said standard time.

58. A data display device according to claim 55, wherein said setting means comprises means for setting a year as said standard time.

59. A data display device according to claim 55, further comprising current time output means for outputting a current time, wherein said computing means comprises means for computing said lapse of time on the basis of said standard time set by said setting means and said current time output by said current time output means.

60. A data display device according to claim 55, wherein said display means comprises a liquid crystal display device.

61. A data display device according to claim 55, wherein said display means comprises means for displaying a current time.

62. A data display device according to claim 61, further comprising selection means for causing said display means to selectively display either said lapse of time or said current time.

63. A data display device according to claim 61, further comprising means for designating said lapse of time to be displayed by said display means.

64. A data display device according to claim 63, further comprising means for designating a current time to be displayed by said display means.

65. A data display device according to claim 61, further comprising means for designating a current time to be displayed by said display means.

66. A data display device according to claim 55, further comprising determining means for determing whether said lapse of time is shorter than one year or not shorter than one year, wherein said determining means permits said display means to display said lapse of time in the format of months and days if said lapse of time is shorter than one year, or in the format of years and months if said lapse of time is not shorter than one year.

67. A data display device according to claim 55, wherein said computing means comprises means for subtracting one past month from a computed lapse of time and adding to said computed lapse of time the number of remaining days after the date of said standard time in the month containing said standard time if a computed lapse of days is negative in the process of computing said lapse of time.

68. A data display device according to claim 55, wherein said computing means comprises means for renewing said lapse of time together with a current time.

69. A data display device according to claim 55, wherein said computing means comprises means for subtracting said standard time from a current time.

70. A data display device according to claim 67, wherein said computing means comprises means for changing a number of days to be added to said lapse of time in response to whether the number of the days of the month containing said standard time changes depending on whether the year is a leap year.

71. A data display device according to claim 55, further comprising warning means for giving a warning if said lapse of time computed by said computing means is determined to be a negative number.

72. A data display device according to claim 71, wherein said warning means comprises means for setting said lapse of time to zero.

73. A data display device according to claim 66, wherein said display means is arranged to display the number of years for said lapse of time not shorter than one year in the months display section for said lapse of time shorter than one year, and the number of months for said lapse of time not shorter than one year in the days display section for said lapse of time shorter than one year.

74. A data display device according to claim 55, further comprising switching means for permitting said display means to display said standard time in said first state of said switching means as well as said lapse of time in said second state of said switching means.

75. A data display device according to claim 74, wherein said first and second states of said switching means correspond to the ON and OFF switching states.

76. A data display device according to claim 55, wherein said display means comprises a displaying section which comprises plural segments formed by seven segments arranged in the form of a Chinese letter "日" and an auxiliary segment which has a linear part that looks like the extension of at least one of said seven segments and a folded part that extends from said linear part in the substantially perpendicular direction to said linear part.

77. A data display device according to claim 76, wherein said auxiliary segment is designed in such a form that extends to the right from the central segment of said seven segments forming a digit in the form of said letter "日" and is folded downward on the way so as to be able to display the lower-case letter "m".

78. A data display device according to claim 76, wherein said auxiliary segment is designed in such a form that extends downward from the right-sided segment of said seven segments forming a digit in the form of said letter "日" and is folded to the left on the way so as to be able to display the lower-case letter "y".

79. A camera, comprising:
(a) setting means for optionally setting a standard time irrespectively of a real time at which said standard time is set,
(b) computing means for automatically computing a lapse of time from said standard time to a current time, and
(c) time lapse recording means for recording on an image recording medium said lapse of time computed by said computing means.

80. A camera according to claim 79, wherein said setting means comprises means for setting a day as said standard time.

81. A camera according to claim 79, wherein said setting means comprises means for setting a month as said standard time.

82. A camera according to claim 79, wherein said setting means comprises means for setting a year as said standard time.

83. A camera according to claim 79, further comprising current time output means for outputting a current time, wherein said computing means comprises means for computing said lapse of time on the basis of said standard time set by said setting means and said current time output by said current time output means.

84. A camera according to claim 79, wherein said image recording medium is photosensitive means.

85. A camera according to claim 84, wherein said photosensitive means is a photographic film.

86. A camera according to claim 79, wherein said time lapse recording means comprises optical recording means.

87. A camera according to claim 79, wherein said time lapse recording means comprises printing means.

88. A camera according to claim 79, wherein said time lapse recording means comprises means for recording a current time.

89. A camera according to claim 88, further comprising selection means for causing said time lapse recording means to selectively record either said lapse of time or said current time.

90. A camera according to claim 88, further comprising means for designating said lapse of time to be recorded by said time lapse recording means.

91. A camera according to claim 90, further comprising means for designating said current time to be recorded by said time lapse recording means.

92. A camera according to claim 88, further comprising means for designating said current time to be recorded by said time lapse recording means.

93. A camera according to claim 79, further comprising determining means for determining whether said lapse of time is shorter than one year or not shorter than one year, wherein said determining means permits said time lapse recording means to record said lapse of time in the format of months and days if said lapse of time is shorter than one year, or in the format of years and months if said lapse of time is not shorter than one year.

94. A camera according to claim 79, wherein said computing means comprises means for subtracting one past month from said computed lapse of time and adding to said computed lapse of time the number of remaining days after the date of said standard time in the month containing said standard time if a computed lapse of days is negative in the process of computing said lapse of time.

95. A camera according to claim 94, wherein said computing means comprises means for changing a number of days to be added to said lapse of time in response to whether the number of the days of the month containing said standard time changes depending on whether the year is a leap year or not.

96. A camera according to claim 79, wherein said computing means comprises means for renewing said lapse of time together with said current time.

97. A camera according to claim 79, wherein said computing means comprises means for subtracting said standard time from said current time.

98. A camera according to claim 79, further comprising warning means for giving a warning if said lapse of time computed by said computing means is determined to be a negative number.

99. A camera according to claim 98, wherein said warning means comprises means for setting said lapse of time to zero.

100. A camera according to claim 79, further comprising display means, having years, months, and days display sections, for displaying said lapse of time, wherein said display means displays the number of years for said lapse of time not shorter than one year in said months display section for said lapse of time shorter than one year, and the number of months for said lapse of time not shorter than one year in said days display section for said lapse of time shorter than one year.

101. A camera according to claim 79, further comprising:
(d) display means for displaying said lapse of time; and
(e) switching means for permitting said display means to display said standard time if said switching means is in a first state as well as said lapse of time if said switching means is in a second state.

102. A camera according to claim 101, wherein said first and second states of said switching means correspond to ON and OFF states.

103. A camera according to claim 79, further comprising display means for displaying said lapse of time, wherein said display means comprises a displaying section which comprises plural signals formed by seven segments arranged in the form of a Chinese letter "日" and an auxiliary segment which has a linear part that forms an extension of at least one of said seven segments and a folded part that extends from said linear part in the substantially perpendicular direction to said linear part.

104. A camera according to claim 103, wherein said auxiliary segment is designed in a form such that it extends to the right from the central segment of said seven segments forming a digit in the form of the Chinese letter "日" and is folded downward so as to be able to display the lower-case letter "m".

105. A camera according to claim 103, wherein said auxiliary segment is designed in a form such that it extends downward from the right-sided segment of said seven segments forming a digit in the form of the Chinese letter "日" and is folded to the left so as to be able to display the lower-case letter "y".

106. A camera for a camera comprising:
(a) setting means for setting a standard time optionally irrespectively of a real time at which said standard time is set,
(b) computing means for automatically computing a lapse of time from said standard time to a current time, and
(c) display means for displaying said time lapse computed by said computing means.

107. A camera according to claim 106, wherein said setting means comprises means for setting a day as said standard time.

108. A camera according to claim 106, wherein said setting means comprises means for setting a month as said standard time.

109. A camera according to claim 106, wherein said setting means comprises means for setting a year as said standard time.

110. A camera according to claim 106, further comprising current time output means for outputting a current time, wherein said computing means comprises means for computing said lapse of time on the basis of said standard time set by said setting means and said current time output by said current time output means.

111. A camera according to claim 106, wherein said display means comprises a liquid crystal display device.

112. A camera according to claim 106, wherein said display means comprises means for displaying a current time.

113. A camera according to claim 112, further comprising selection means for causing said display means to selectively display either said lapse of time or said current time.

114. A camera according to claim 112, further comprising means for designating said lapse of time to be displayed by said display means.

115. A camera according to claim 114, further comprising means for designating a current time to be displayed by said display means.

116. A camera according to claim 112, further comprising means for designating a current time to be displayed by said display means.

117. A camera according to claim 106, further comprising determining means for determining whether said lapse of time is shorter than one year or not shorter than one year, wherein said determining means permits said display means to display said lapse of time in the format of months and days if said lapse of time is shorter than one year, or in the format of years and months if said lapse of time is not shorter than one year.

118. A camera according to claim 106, wherein said computing means comprises means for subtracting one past month from a computed lapse of time and adding to said computed lapse of time the number of remaining days after the date of said standard time in the month containing said standard time if a computed lapse of days is negative in the process of computing said lapse of time.

119. A camera according to claim 106, wherein said computing means comprises means for renewing said lapse of time together with a current time.

120. A camera according to claim 106, wherein said computing means comprises means for subtracting said standard time from a current time.

121. A camera according to claim 118, wherein said computing means comprises means for changing a number of days to be added to said lapse of time in response to whether the number of the days of the month containing said standard time changes depending on whether the year is a leap year.

122. A camera according to claim 106, further comprising warning means for giving a warning if said lapse of time computed by said computing means is determined to be a negative number.

123. A camera according to claim 122, wherein said warning means comprises means for setting said lapse of time to zero.

124. A camera according to claim 117, wherein said display means is arranged to display the number of years for said lapse of time not shorter than one year in the months display section for said lapse of time shorter than one year, and the number of months for said lapse of time not shorter than one year in the days display section for said lapse of time shorter than one year.

125. A camera according to claim 106, further comprising switching means for permitting said display means to display said standard time in said first state of said switching means as well as said lapse of time in said second state of said switching means.

126. A camera according to claim 125, wherein said first and second states of said switching means correspond to the ON and OFF switching states.

127. A camera according to claim 106, wherein said display means comprises a displaying section which comprises plural segments formed by seven segments arranged in the form of a Chinese letter "日" and an auxiliary segment which has a linear part that looks like the extension of at least one of said seven segments and a folded part that extends from said linear part in the substantially perpendicular direction to said linear part.

128. A camera according to claim 127, wherein said auxiliary segment is designed in such a form that extends to the right from the central segment of said seven segments forming a digit in the form of said letter "日" and is folded downward on the way so as to be able to display the lower-case letter "m".

129. A camera according to claim 127, wherein said auxiliary segment is designed in such a form that extends downward from the right-sided segment of said seven segments forming a digit in the form of said letter "日" and is folded to the left on the way so as to be able to display the lower-case letter "y".

* * * * *

UNITED STATES PATENT AND TRADEMARK OFFICE
CERTIFICATE OF CORRECTION

PATENT NO. : 4,989,025

DATED : January 29, 1991

INVENTOR(S) : Koichi Matsumura, et al.

It is certified that error appears in the above-identified patent and that said Letters Patent is hereby corrected as shown below:

ON THE COVER PAGE

At [30], "Oct. 2, 1988" should read --Feb. 10, 1988--, both occurrences.

IN THE DRAWINGS

Sheet 12, Fig. 16O, "DIGHT" should read --DIGIT--; and
    Sheet 12, Fig. 16P, "DIGHT" should read --DIGIT--.
    Sheet 30, Fig. 16H should be deleted.

UNITED STATES PATENT AND TRADEMARK OFFICE
CERTIFICATE OF CORRECTION

PATENT NO. : 4,989,025
DATED : January 29, 1991
INVENTOR(S) : Koichi Matsumura, et al.

It is certified that error appears in the above-identified patent and that said Letters Patent is hereby corrected as shown below:

IN THE DRAWINGS

Figure 7:
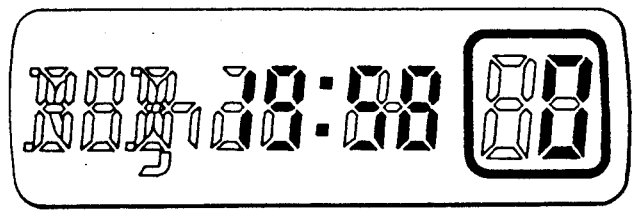

After Sheet 4, Fig. 7, insert Figures 8 and 9:

FIG.8

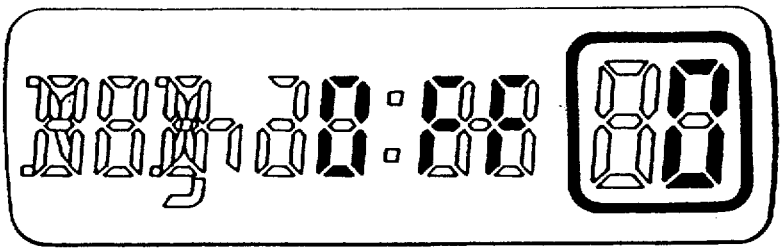

FIG.9

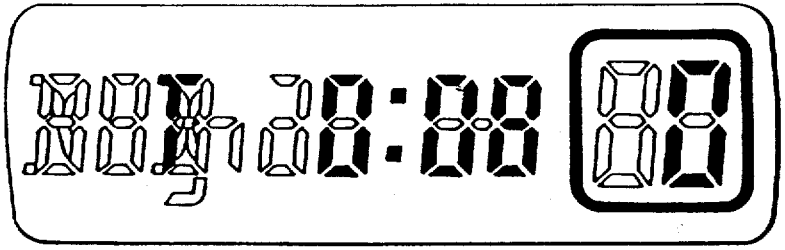

UNITED STATES PATENT AND TRADEMARK OFFICE
CERTIFICATE OF CORRECTION

PATENT NO. : 4,989,025                    Page 3 of 6
DATED : January 29, 1991
INVENTOR(S) : Koichi Matsumura, et al.

It is certified that error appears in the above-identified patent and that said Letters Patent is hereby corrected as shown below:

IN THE DRAWINGS

Before Sheet 5, Fig. 12, insert Figures 10 and 11:

FIG.10

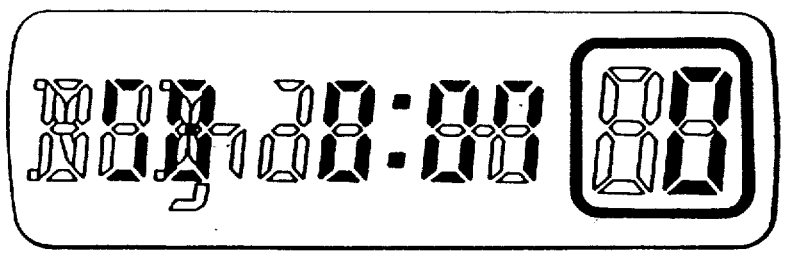

FIG.11

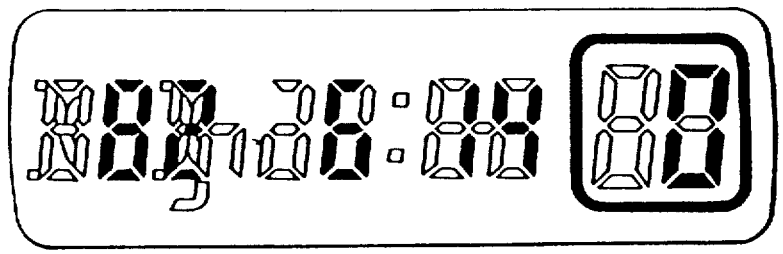

UNITED STATES PATENT AND TRADEMARK OFFICE
CERTIFICATE OF CORRECTION

PATENT NO. : 4,989,025

DATED : January 29, 1991

INVENTOR(S) : Koichi Matsumura, et al.

It is certified that error appears in the above-identified patent and that said Letters Patent is hereby corrected as shown below:

COLUMN 1

Line 36, "at" should read --with--.
Line 60, "substracting" should read --subtracting--.

COLUMN 2

Line 61, "flow charts" should read --flowchart--.

COLUMN 3

Line 2, "A" should be deleted.
Line 4, "system" should read --a system--.
Line 13, "CPU) the" should read --the CPU)--.

COLUMN 5

Line 40, "of" should be deleted.

COLUMN 6

Line 14, " "OmOd" " should read --"OmOd"--.

UNITED STATES PATENT AND TRADEMARK OFFICE
CERTIFICATE OF CORRECTION

PATENT NO. : 4,989,025
DATED : January 29, 1991
INVENTOR(S) : Koichi Matsumura, et al.

It is certified that error appears in the above-identified patent and that said Letters Patent is hereby corrected as shown below:

COLUMN 9

Line 35, "interval timer." should read
   --interval timer displays--.
Line 38, " "mont/day/year" " should read
   -- "month/day/year" --.

COLUMN 10

Line 43, "schematical" should read --schematic--.

COLUMN 11

Line 68, "is" should be deleted.

COLUMN 12

Line 27, "in" should be deleted.

COLUMN 14

Line 24, "witches" should read --switches--.

COLUMN 15

Line 6, "is" should read --are--.
Line 7, "It" should read --If it--.
Line 8, "or" should read --of--.

COLUMN 16

Line 17, "to to" should read --to--.
Line 18, "down within" should read --down to within--.
Line 37, "a" should read --the--.

UNITED STATES PATENT AND TRADEMARK OFFICE
CERTIFICATE OF CORRECTION

PATENT NO. : 4,989,025

DATED : January 29, 1991

INVENTOR(S) : Koichi Matsumura, et al.

It is certified that error appears in the above-identified patent and that said Letters Patent is hereby corrected as shown below:

COLUMN 17
Line 6, "in a" should be deleted.
Line 11, "j Step" should read --Step--.

COLUMN 18

Line 27, "PA the mode" should read --the PA mode--.

COLUMN 20

Line 11, "delivers" should read --delivering--.

COLUMN 23

Line 13, "The," should read --Thus,--.

COLUMN 24

Line 34, "are" should read --is--.

COLUMN 32

Line 36, delete "for a camera".

Signed and Sealed this

Fifteenth Day of December, 1992

*Attest:*

DOUGLAS B. COMER

*Attesting Officer*    *Acting Commissioner of Patents and Trademarks*